(12) United States Patent
Mori et al.

(10) Patent No.: US 6,463,185 B1
(45) Date of Patent: Oct. 8, 2002

(54) INFORMATION RECORDING MEDIUM AND INFORMATION REPRODUCING APPARATUS

(75) Inventors: Takeshi Mori, Machida (JP); Shinzo Matsui, Uenohara-machi (JP); Hiroyoshi Fujimori, Hachiuoji (JP); Shinichi Imade, Iruma (JP); Hiroshi Sasaki, Hachiouji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/275,062

(22) Filed: Mar. 23, 1999

Related U.S. Application Data

(62) Division of application No. 08/776,325, filed on Jan. 24, 1997.

(30) Foreign Application Priority Data

Jul. 26, 1994 (JP) .............................. 6-173966

(51) Int. Cl.⁷ .......................... G06K 9/60; G11B 7/20; H04N 9/79; H04L 1/00
(52) U.S. Cl. ........................ 382/302; 382/305; 369/94; 386/40; 714/746
(58) Field of Search ................................ 382/232, 302, 382/305, 312, 317; 358/401, 403, 444, 448, 452; 369/93, 94; 714/746, 822; 386/40

(56) References Cited

U.S. PATENT DOCUMENTS

| | | | | |
|---|---|---|---|---|
| 4,835,777 A | * | 5/1989 | DeLuca et al. .............. 714/822 |
| 5,060,219 A | * | 10/1991 | Lokhoff et al. ............... 369/48 |
| 5,111,292 A | | 5/1992 | Kuriacose et al. ..... 375/240.01 |
| 5,226,027 A | * | 7/1993 | Bakx ........................... 369/58 |
| 5,336,844 A | * | 8/1994 | Yamauchi et al. ............ 84/602 |
| 5,376,965 A | * | 12/1994 | Nagasaki et al. ........... 348/232 |
| 5,398,225 A | * | 3/1995 | Sugaya et al. ........... 369/30.23 |
| 5,402,399 A | * | 3/1995 | Oshida et al. ........... 369/30.23 |
| 5,426,653 A | * | 6/1995 | Hayes et al. ................. 714/797 |
| 5,481,103 A | | 1/1996 | Wang .......................... 235/494 |
| 5,541,396 A | * | 7/1996 | Rentsch ....................... 235/454 |
| 5,543,925 A | * | 8/1996 | Timmermans .............. 358/310 |
| 5,754,687 A | * | 5/1998 | Fujimori et al. ............. 382/190 |
| 5,774,583 A | * | 6/1998 | Sasaki et al. ................ 382/190 |

FOREIGN PATENT DOCUMENTS

| | | | | |
|---|---|---|---|---|
| EP | 0483936 A2 | 5/1992 | | |
| EP | 0670555 | * 4/1994 | ............ G06K/1/12 |
| EP | 0598184 A2 | 5/1994 | | |
| EP | 0 670 555 | 9/1995 | | |
| EP | 0 713 194 | 5/1996 | | |
| EP | 0713194 | * 5/1996 | .......... G06K/19/00 |
| WO | WO 93/17396 | 9/1993 | | |
| WO | WO 94/08314 | 4/1994 | | |

* cited by examiner

Primary Examiner—Amelia M. Au
Assistant Examiner—Mehrdad Dastouri
(74) Attorney, Agent, or Firm—Frishauf, Holtz, Goodman & Chick, P.C.

(57) ABSTRACT

An information recording medium (30) has a recorded system control file (SCF) (96) representing processing parameters necessary for reproduction processing for reading out a print-recorded code pattern and reproducing original multimedia information. With an SCF readout switch (88) operated, an initially determined SCF read-out parameter is input from a parameter memory (92) to a controller (66). The controller (66) controls each part in accordance with the input parameter and outputs read-out image data as a 1-SDU₁ to an overlying layer and a state signal, that is, a signal showing that the SCF is being read out, as a 1-SDU₂ to the overlying layer. The overlying layer decodes the contents of the SCF (96) and a parameter setting signal is input as the 1-SDU₃ from the overlying layer and it is stored in the layer 1 parameter memory (92). At a time of reading out an actual dot code (10) corresponding to the operation of a scanning start switch (86) the parameter memory (92) utilizes its stored contents.

7 Claims, 14 Drawing Sheets

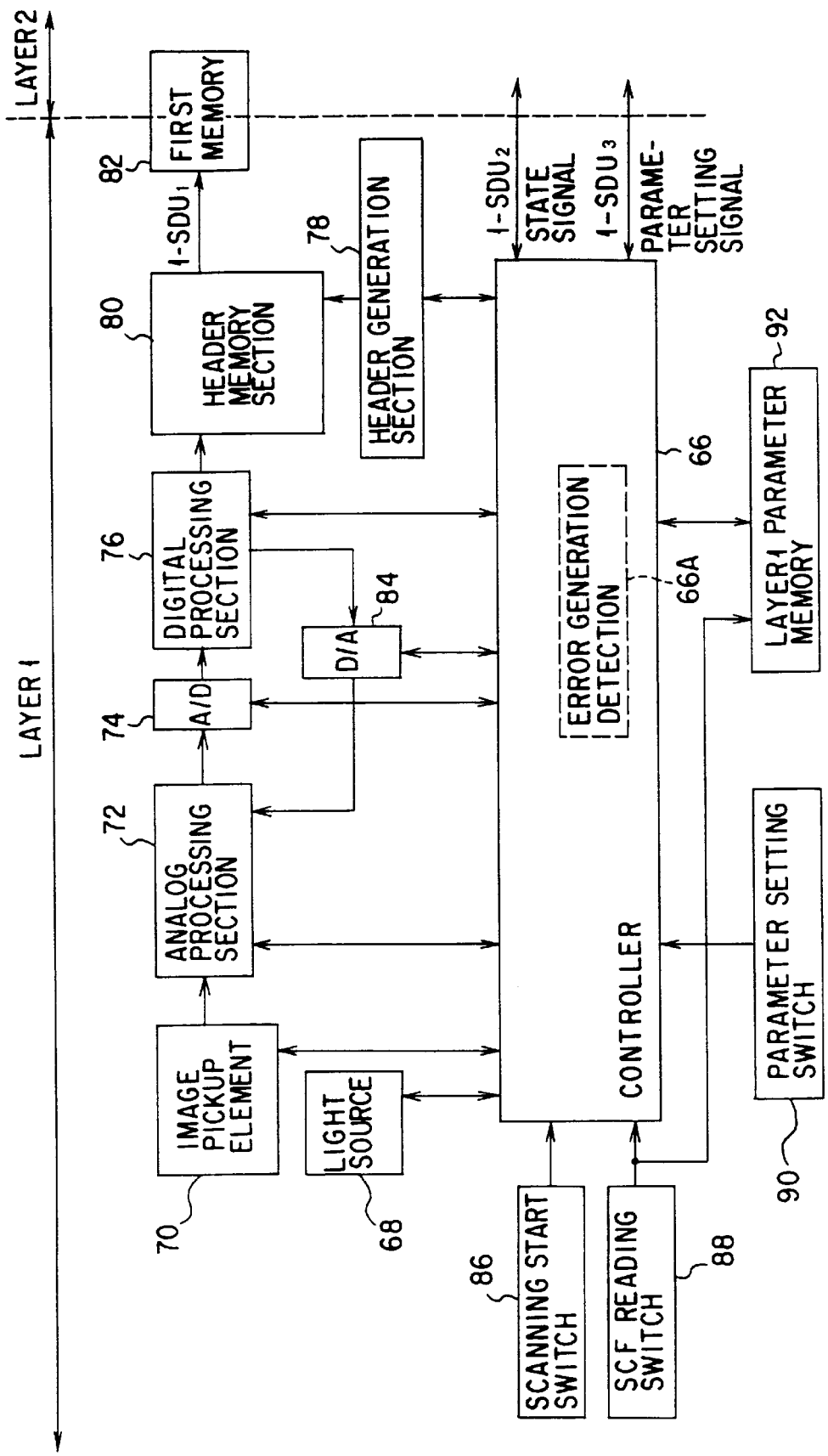
F I G. 5

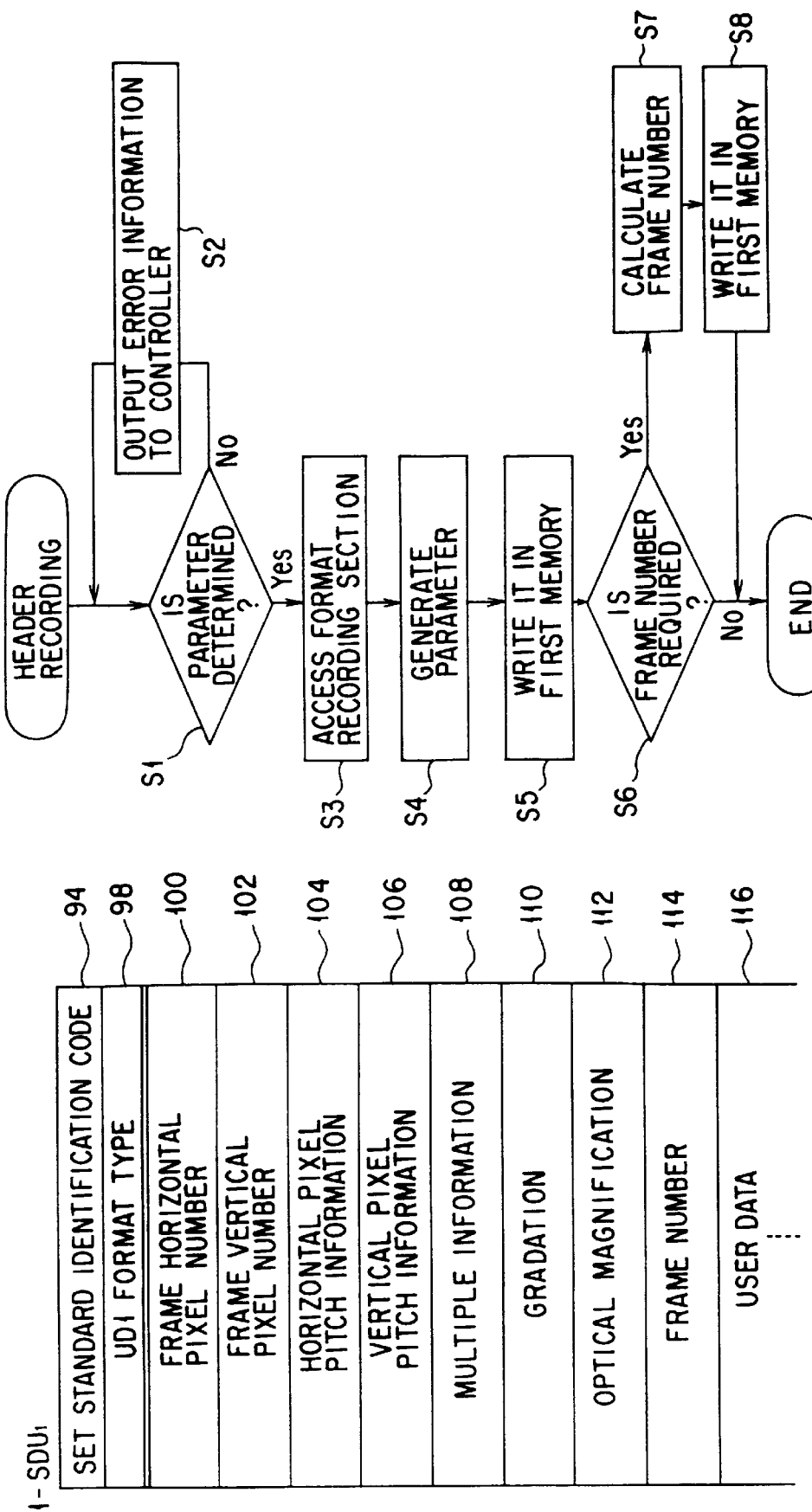

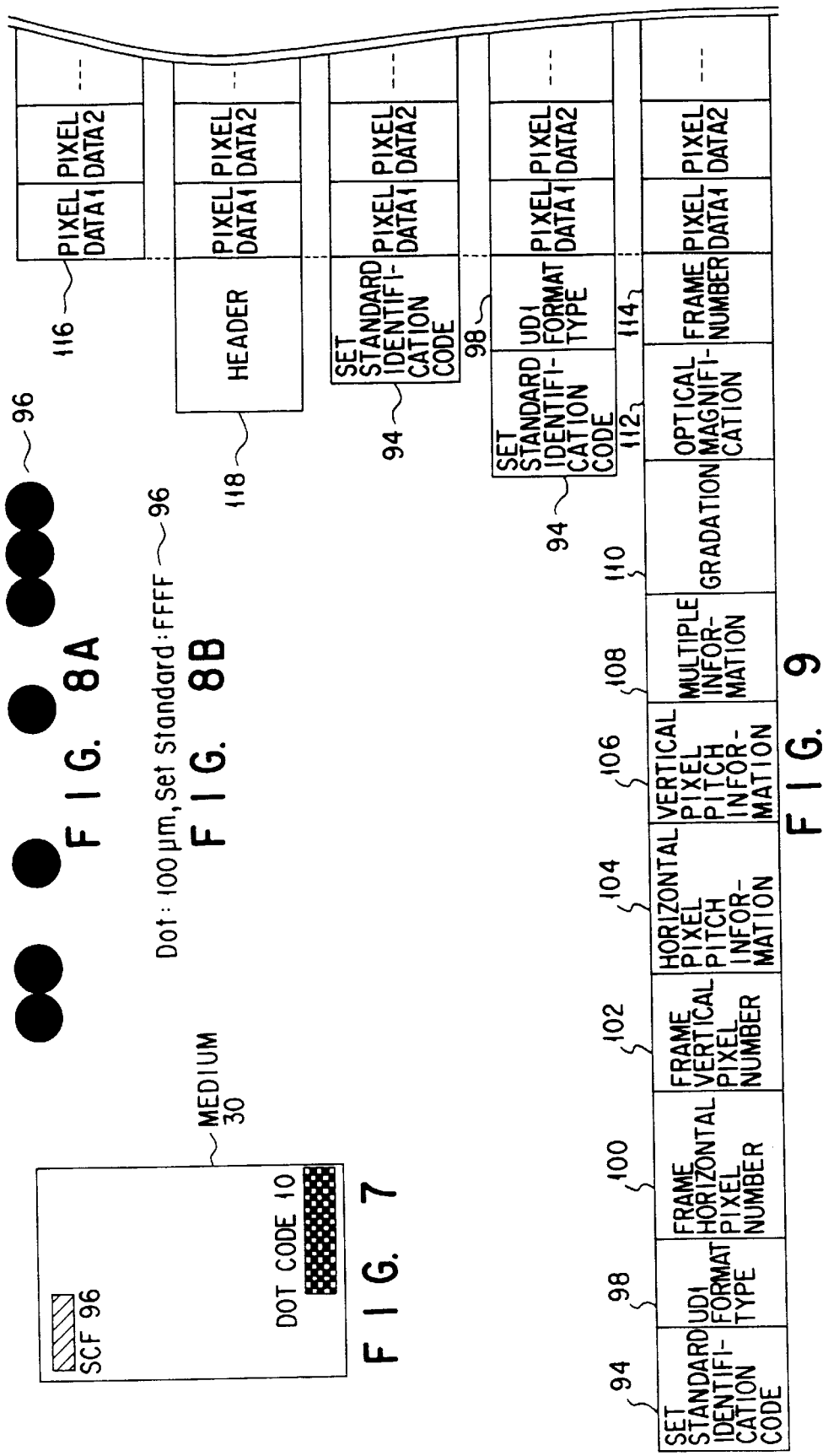

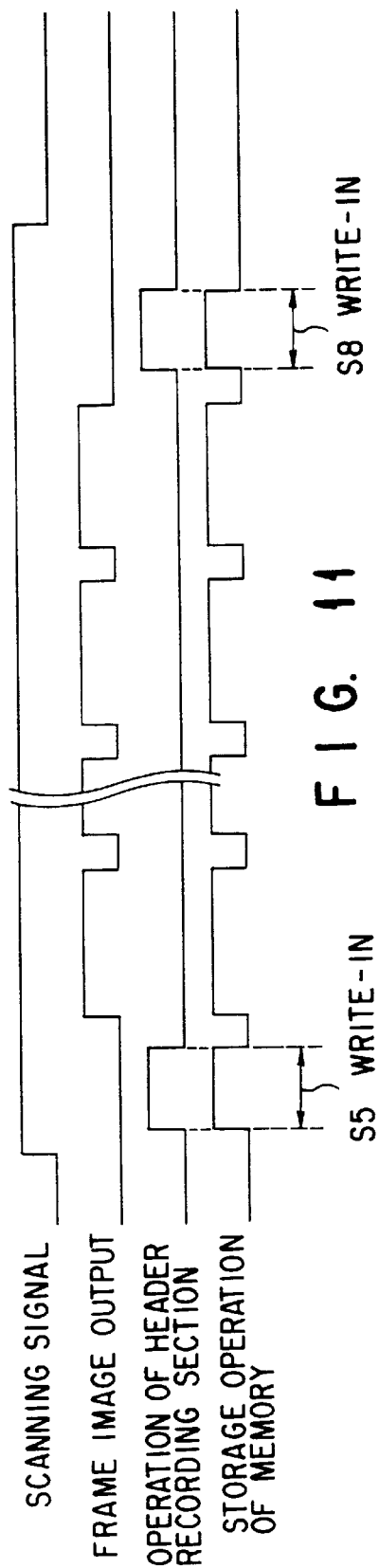
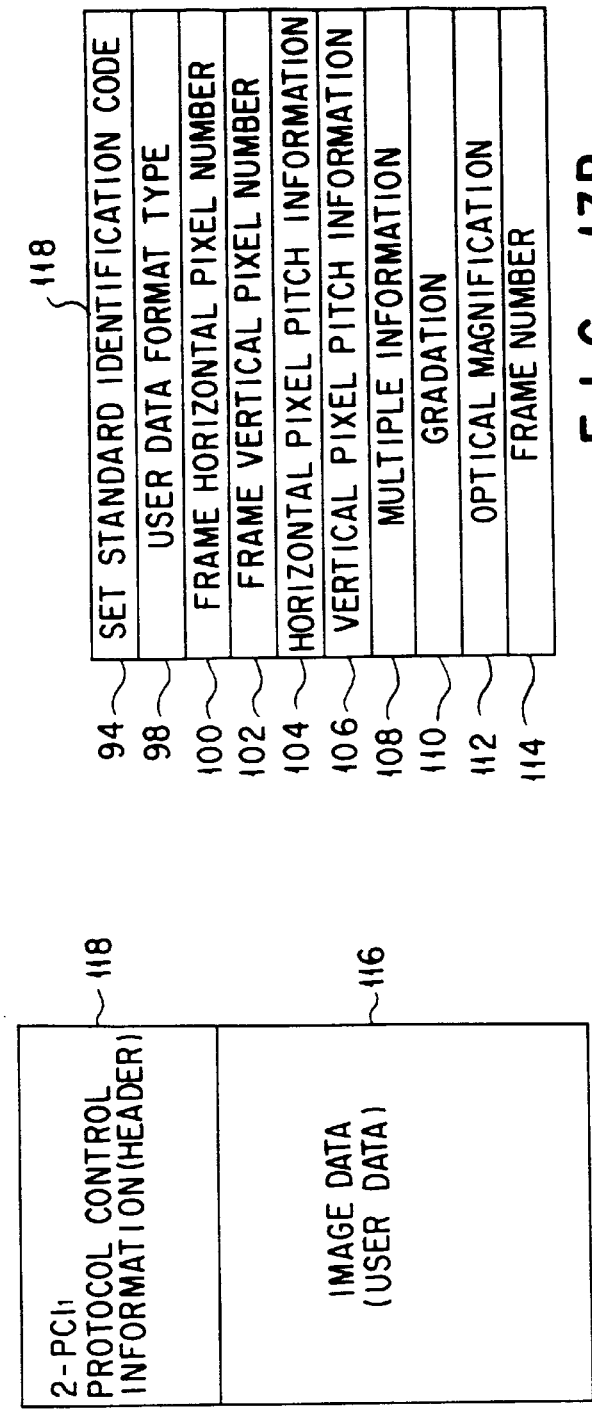
FIG. 11
FIG. 13A
FIG. 13B

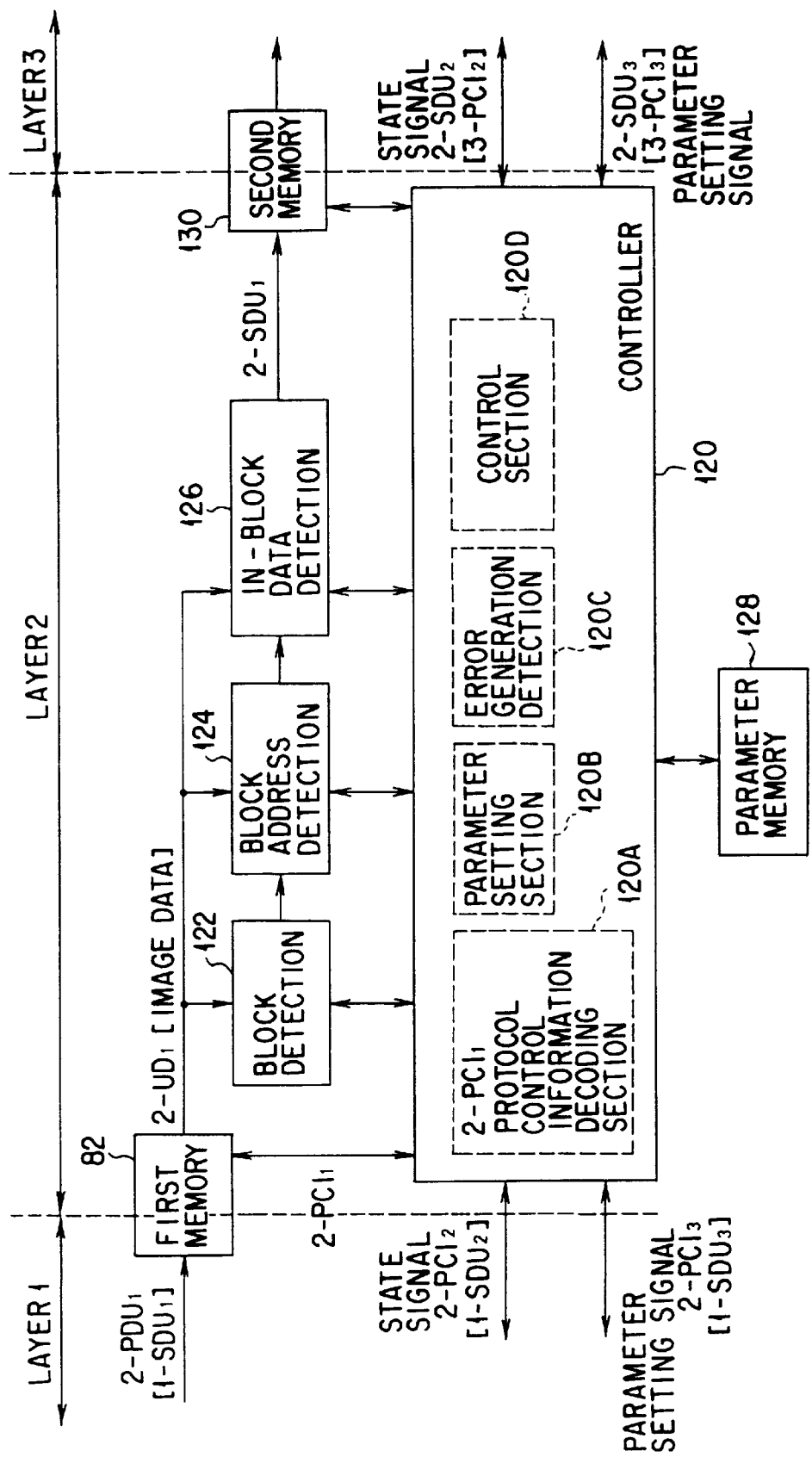
F I G. 12

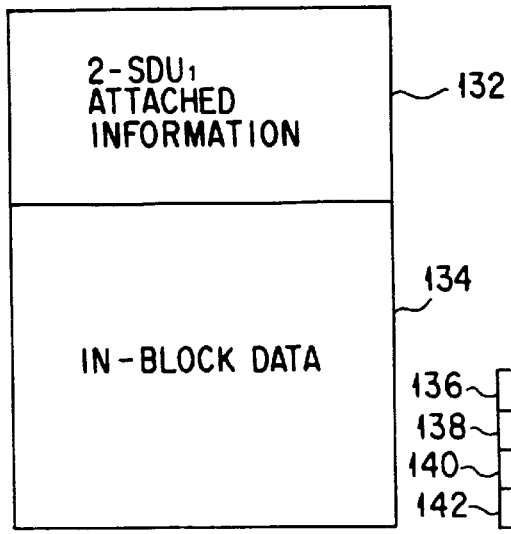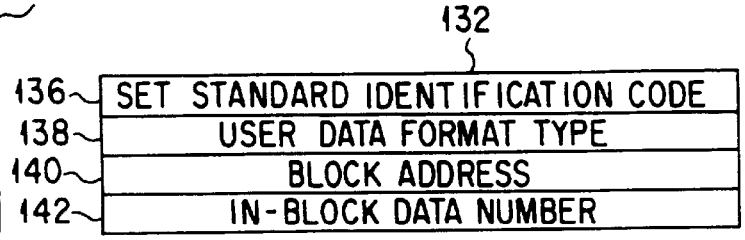
F I G. 14A          F I G. 14B
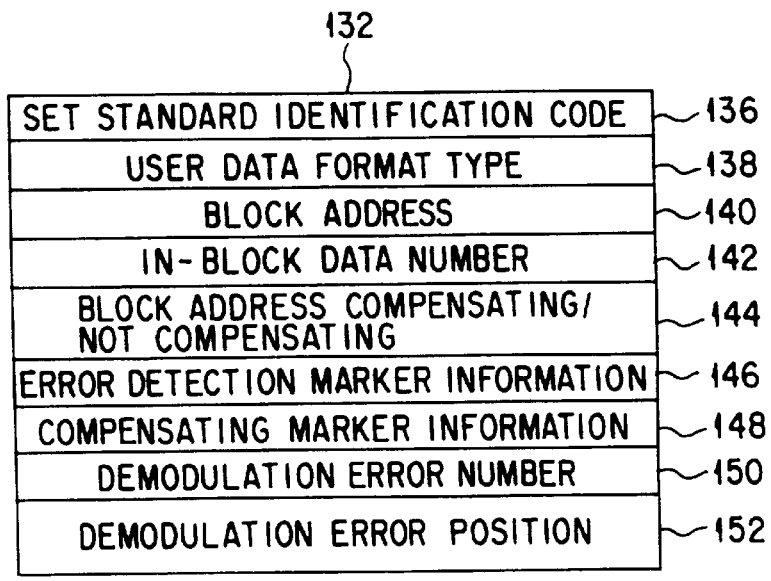
F I G. 15

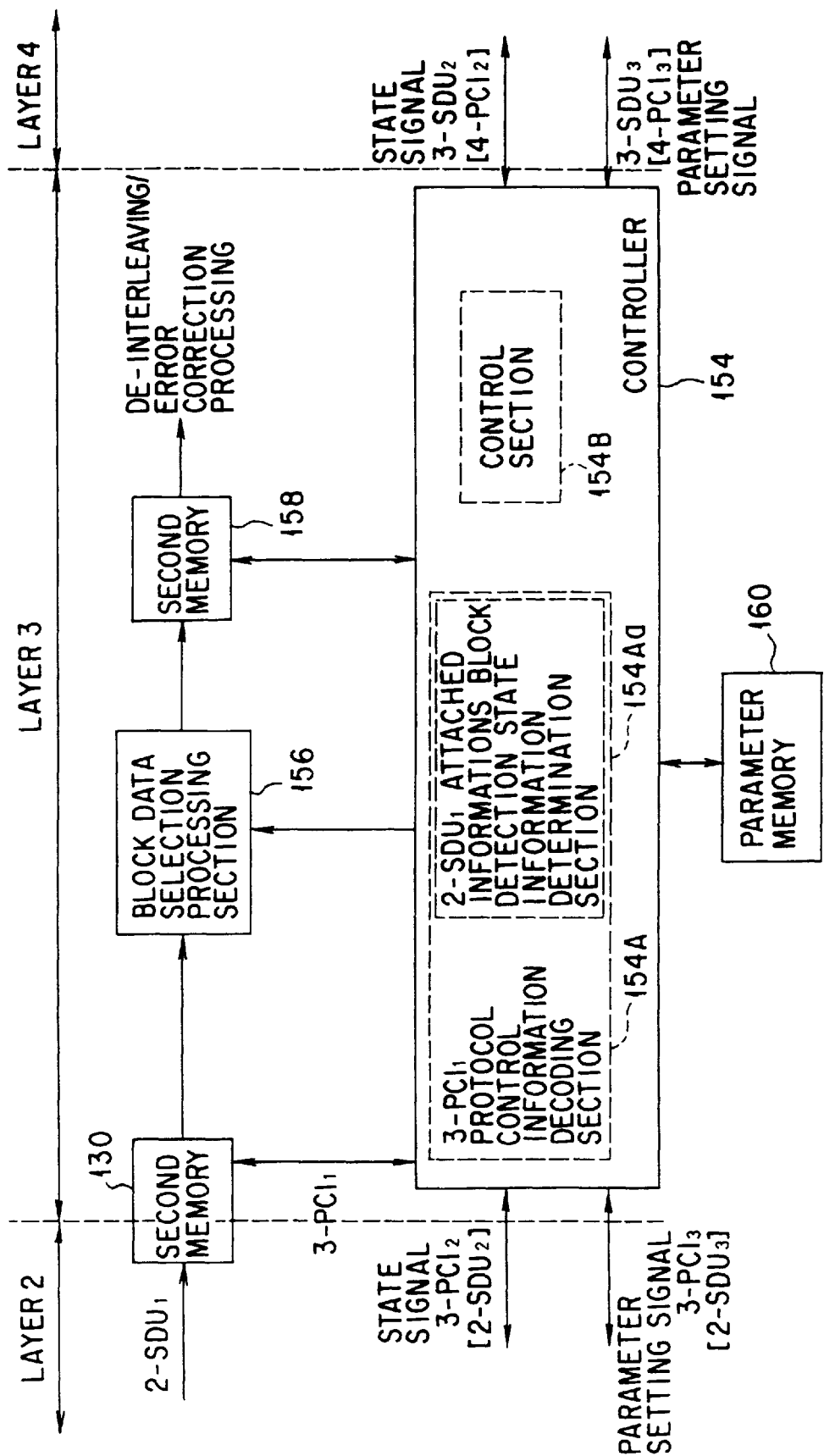
F I G. 17

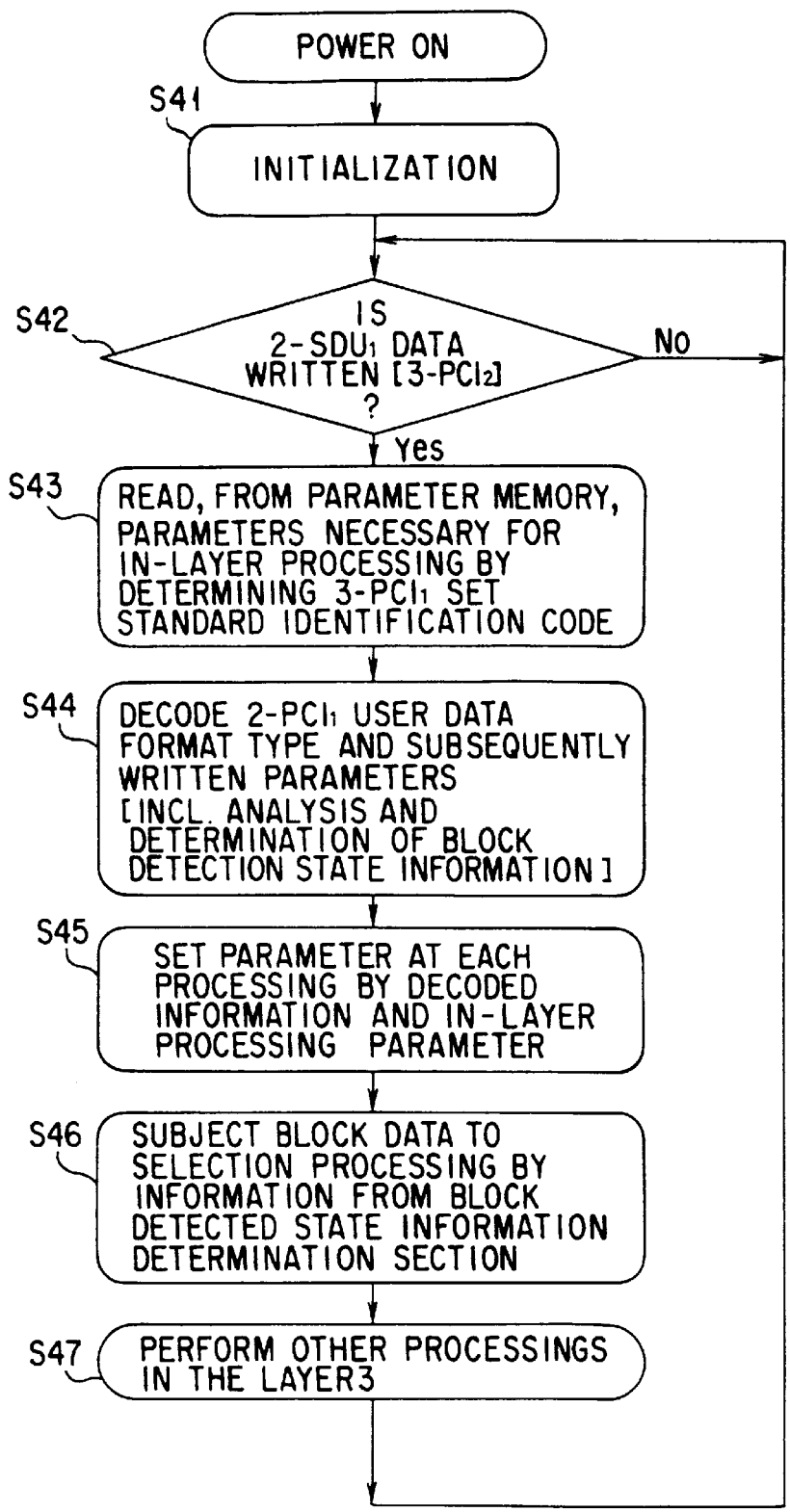
F I G. 18

INFORMATION RECORDING MEDIUM AND INFORMATION REPRODUCING APPARATUS

This is a division of application Ser. No. 08/776,325 filed Jan. 24, 1997 now U.S. Pat. No. 5,920,661 Jul. 6, 1999.

FIELD OF THE INVENTION

The present invention relates to an information recording medium, such as a paper sheet, recording, as an optically readable code pattern, a so-called multimedia information including, for example, audio information such as speech and music, video information obtained from a camera and video device and digital code data, and to an information reproducing apparatus for optically reading out the code pattern on the information recording medium and reproducing its original multi-media information.

BACKGROUND OF THE INVENTION

Various media, such as magnetic tapes and optical disks, have conventionally been known as the media for recording the speech, music and so on. These media, being manufactured in large quantity, involve somewhat high cost per unit and, in addition, take up a greater storage space. In the case where any speech-recorded medium has to be handed over to another person at a distant place, a lot of time and effort are required even if it is mailed, or directly passed over, to him or her. The same thing can also be said about the so-called multimedia information as a whole including, not only the audio information but also the video information obtained from the camera, video device, etc., and digital code data obtained from personal computers, word processors, etc.

A group, including some of the inventors, has invented a system capable of recording the multimedia information containing at least one of the audio information, video information and digital code data on an information recording medium, such as a paper sheet, on dot code form, that is, as image information, namely, coded information, capable of facsimile transmission and copying in large quantity at low costs and a system for reproducing it and has filed these systems as an international application PCT/JP93/01377 (WO 94/08314).

In the information reproducing system under this international application an information reproducing apparatus is adapted to optically read out the dot code on the information recording medium and reproduce it. This method comprises effecting reading operation by, while manually holding the information reproducing apparatus, scanning the recording medium along its recorded dot code.

However, the structure of the dot code pattern per se is now under investigation so as to further improve the recording density. Under this situation no full consideration has yet been given to the information recording medium and information reproducing apparatus under the above-mentioned international application in terms of the flexibility of their future changes or modifications.

It is also desirable to more positively effect the reproduction of the code pattern.

SUMMARY OF THE INVENTION

It is accordingly the object of the present invention to provide an information recording medium and information reproducing apparatus which can positively reproduce a code pattern and, even if the structure of the code pattern per se is varied in the future, can deal with this situation.

According to a first aspect of the present invention, an information recording medium including a section recording, as an optically readable code pattern, multimedia information containing at least one of audio information, video information and digital code data, the recording medium recording information representing processing parameters necessary to decode the above-mentioned code pattern.

According to a second aspect of the present invention an information reproducing apparatus is provided for, out of an information recording medium having a section recording, as an optically readable code pattern, multimedia information containing at least one of audio information, video information and digital code data, reading the code pattern and reproducing original multimedia information, wherein the information recording medium records information representing processing parameters necessary to decode the code pattern; and input means is provided for inputting the information representing the processing parameters recorded on the information recording medium.

According to a third aspect of the present invention an information reproducing apparatus comprises first layer processing means for, out of a recording media having a section recording, as an optically readable code, multimedia information containing at least one of audio information, video information and digital code data, optically reading the data and for converting the read-out code as an image to code data while outputting the readout-related information in a way to be added as first processing information to the code data; second layer processing means for recognizing the first processing information output from the first layer processing means and processing the code data output from the first layer processing means and for generating a block with the code data gathered for each predetermined unit and outputting the block; third layer processing means for extracting, out of the code data of the block, and recognizing second processing information at least necessary to gather blocks output from the second layer processing means and generate a supermacroblock of greater predetermined unit and generating a supermacroblock on the basis of the second processing information, for extracting, from the supermacroblock, and recognizing the third processing information for performing error-handling-related processing and performing, on the basis of the third processing information, supermacroblock error-handling-related processing and for outputting a subset element generated by separating supermacroblocks on the basis of the third processing information; fourth layer processing means for extracting, out of the subset element output from the third layer processing means, fourth processing information at least necessary to generate a subset comprised of a code of a predetermined unit capable of reproducing the multimedia information and for outputting the subset generated based on the fourth processing information; and outputting means for outputting the subset which is output from the fourth layer processing means as repromultimedia information, wherein the first layer processing means comprises image pick-up means for picking up the code; quantizing means for quantizing a video signal from the image pickup means and for converting the quantized signal to the code data; header generation means for generating information relating to the image pickup and quantization and adding the information as the first processing information to the code data; and memory means for storing the code data to which the first processing information is added.

BRIEF DESCRIPTION OF THE DRAWINGS

FIG. 5 is a block diagram showing a layer 1 in one embodiment;

FIG. 6 is a view showing one example of a first layer service data unit No. 1 (1-SDU$_1$);

FIGS. 7, 8A and 8B are views for explaining a system control file (SCF);

FIG. 9 is a view showing a way to how to write a header;

FIG. 10 is a flow chart for explaining header recording processing performed at a header generation section and header recording section of the layer 1;

FIG. 11 is a timing chart for explaining a header writing timing;

FIG. 12 is a block diagram showing a layer 2 in the embodiment;

FIG. 13A is a view showing 1-SDU$_1$ (2-PDU$_1$) written in a first memory in FIG. 12 and FIG. 13B is a view showing the contents of 2-PCI$_1$ protocol control information;

FIG. 14A is a view showing 2-SDU$_1$ written in a second memory and

FIG. 14B is a view showing the contents of 2-SDU$_1$ attached information in FIG. 14A in the case where a user data format type is a code [01];

FIG. 15 is a view showing 2-SDU$_1$ attached information in the case where a user data format type is a code [02];

FIG. 17 is a block diagram showing a layer 3 in the embodiment; and

FIG. 18 is a flow chart for explaining the operation of the layer 3.

DETAILED DESCRIPTION

Before the explanation of the embodiment of the present invention, an explanation will be given of the code pattern of a dot code set out in more detail in PCT/JP93/01377 (WO 94/08314).

Figure 1A:
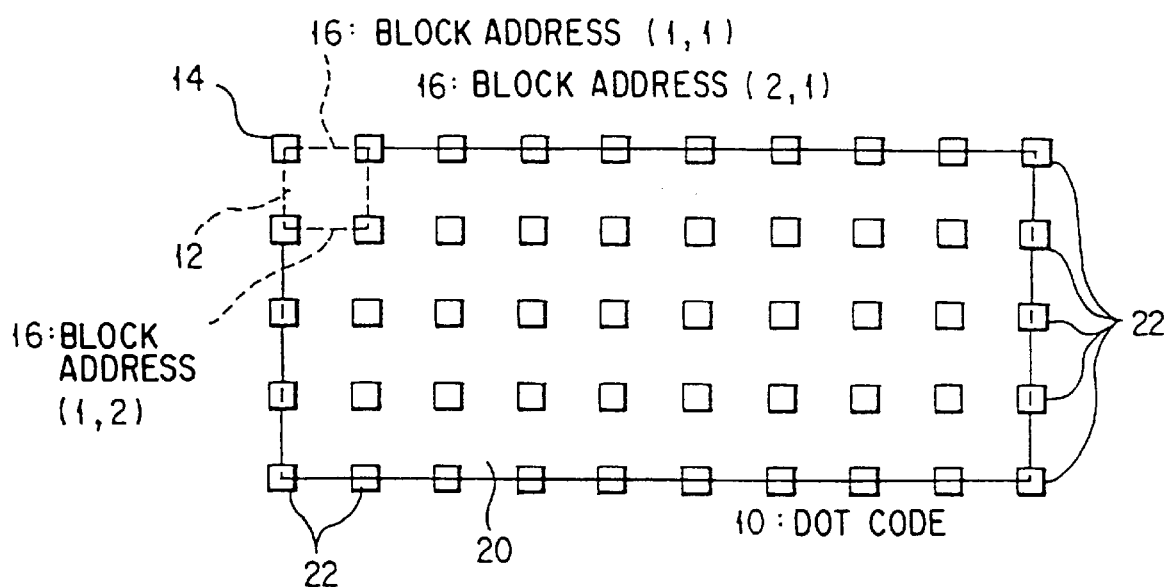
FIGS. 1A and 1B, respectively, show a format of a dot code.
Figure 1B:
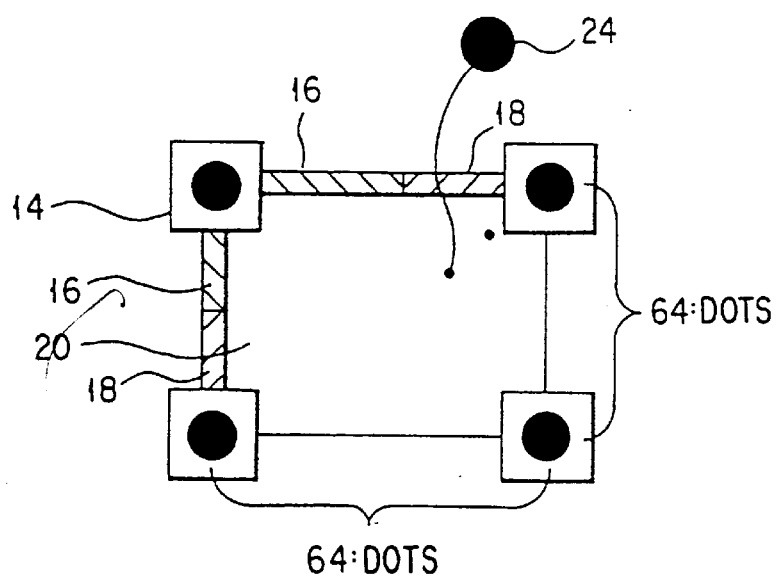

As shown in FIGS. 1A and 1B, a dot code 10 comprises a plurality of blocks 12 comprised of a plurality of dots arranged in accordance with the contents of data, that is, a collection of blocks 12 comprised of data in each given unit. One block 12 comprises markers 14, block addresses 16, address error detection data 18 and data area into which actual data enters.

Each block 12 constituting the dot code 10 is comprised of a two-dimensional array and has an attached block address 16. The block address 16 has those addresses corresponding to X and Y addresses. For example, the left top block in FIG. 1A is indicated by X address, Y address)= (1,1) and the block address of the next right block is by (2,1). In this way, those block addresses 16 are attached to all the blocks 12, the X address being incremented toward the right side and the Y address toward the bottom side.

Here, the lowest and rightest markers are made dummy markers. That is, the block 12 against a given marker 14 corresponds to diagonally right lower data surrounded with four markers including the marker above and the lowest and rightest stage marker corresponds to a subsidiary, that is a dummy, marker 22 and arranged to define a block corresponding to a lower second and right second marker.

An explanation will now be given below about the contents of that block 12. As shown in FIG. 1B, the block address 16 and error detection code 18 of this block address are attached between the marker 14 of the given block 12 and a lower marker. Further, a block address 16 and its error detection code 18 are similarly attached between that marker 14 and the right marker. In this way, the block address 16 is arranged on the left and upper sides of the data area 20 so that the given marker 14 is located at a left upper angle position. It is to be noted that the block address 16 is located at two places in one block but that a single block address may be provided. It is, however, preferable to provide the block address at two places because, even if any error occurs due to noise on one block address, it is still possible to positively detect a correct one at the other address.

By adopting the two-dimensional block division system as set out above, four adjacent markers are detected on the information reproducing side and a marker-to-marker interval is divided into equal parts in accordance with the number of dots. Through the use of such a normalization it is possible to deal with the enlarging, contracting, deformation, etc., robustly and to positively present any hand shaking, etc.

The data dot 24 of the data area 20 has a size of, for example, a few tens of μm per dot. The dot size can be made down to a few μm, depending upon the application and usage, and normally 40 μm, 20 μm or 80 μm. The data area 20 has a size of, for example, 64×64 dots. These sizes can be freely enlarged or contracted in a range where it is possible to absorb any error resulting from the division into equal parts as set out above. Further, the marker 14 serves as a position indicator and, in the case of a size not possessed by any modulated data, it is made as a block marker of, for example, above 7 dots in a round configuration and about 7×7 dots in a circular configuration relative to the data dot 24. Further, the block address 16 and its error detection data 18 are similarly comprised of those dots for the case of the data dot 24.

An explanation will be given below of a layered segment form under the information transfer protocols in a multimedia paper (MMP) system adapted to record and reproduce multimedia information to and from an information recording medium, such as paper, as an optically readable code pattern, for example, a code pattern as set out in more detail in JPN PAT APPLN 6-121368 (PCT/JP95/01050) filed by the same inventors as those of the present application. Here, the layer N (N=1 to 5) protocol is an operation protocol for realizing necessary functions for N layers to respond to requests from those adjacent layers.

Figure 2:
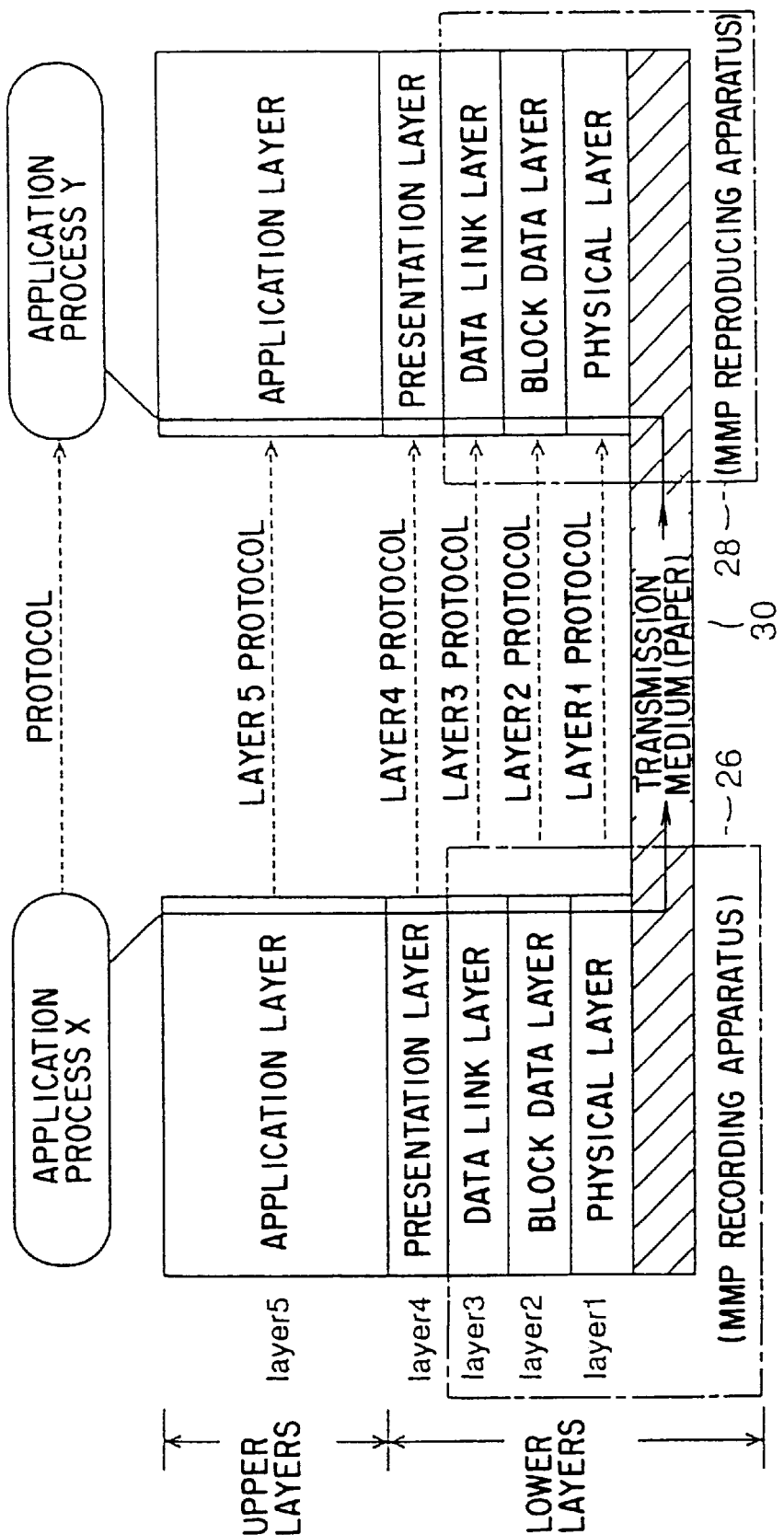
FIG. 2 is a view showing a practical layered segment structure of an information transfer protocol in a multimedia paper system.

As shown in FIG. 2, the layered segments provide a logical layered structure, on a recording and reproducing sides, with layers 1 to 5.

On the recording side, the so-called multimedia information containing audio information such as speech and musics, video information obtained from cameras and video devices and digital code data obtained from personal computers and word processors, as generated through an application process X, in general, through an application program on a computer is passed to an MMP recording apparatus 26 as an information recording apparatus through an application layer (layer 5) and presentation layer (layer 4) similarly on the computer. At the MMP recording apparatus, the received data is printed/recorded on an information recording medium (transmission medium) 30, such as paper, as an optically readable dot pattern through a data link layer (layer 3), block data layer (layer 2) and physical layer (layer 1).

The information recording medium (transmission medium) 30 is passed to the reproducing side. Or the code pattern recorded on the medium 30 can be faxed to the reproducing side where it is printed/recorded.

At the MMP reproducing apparatus, the code pattern recorded on such information recording medium 30 has its image picked up and, after being subjected to data edit processing through a reproducing process from the layer 1 to the layer 3 or layer 5, that is, through a process reverse to that at the recording time, result data ia passed to the reproducing-side computer. On the reproducing-side computer, through the process reverse to that on the recording side as required through the layers 4 and 5, reproduced multimedia information is passed to the application process (application program).

A detailed explanation will be given below of those layers on the reproducing side while omitting an explanation on the recording side in view of its process being reverse to that on the reproducing side.

Figure 3A:
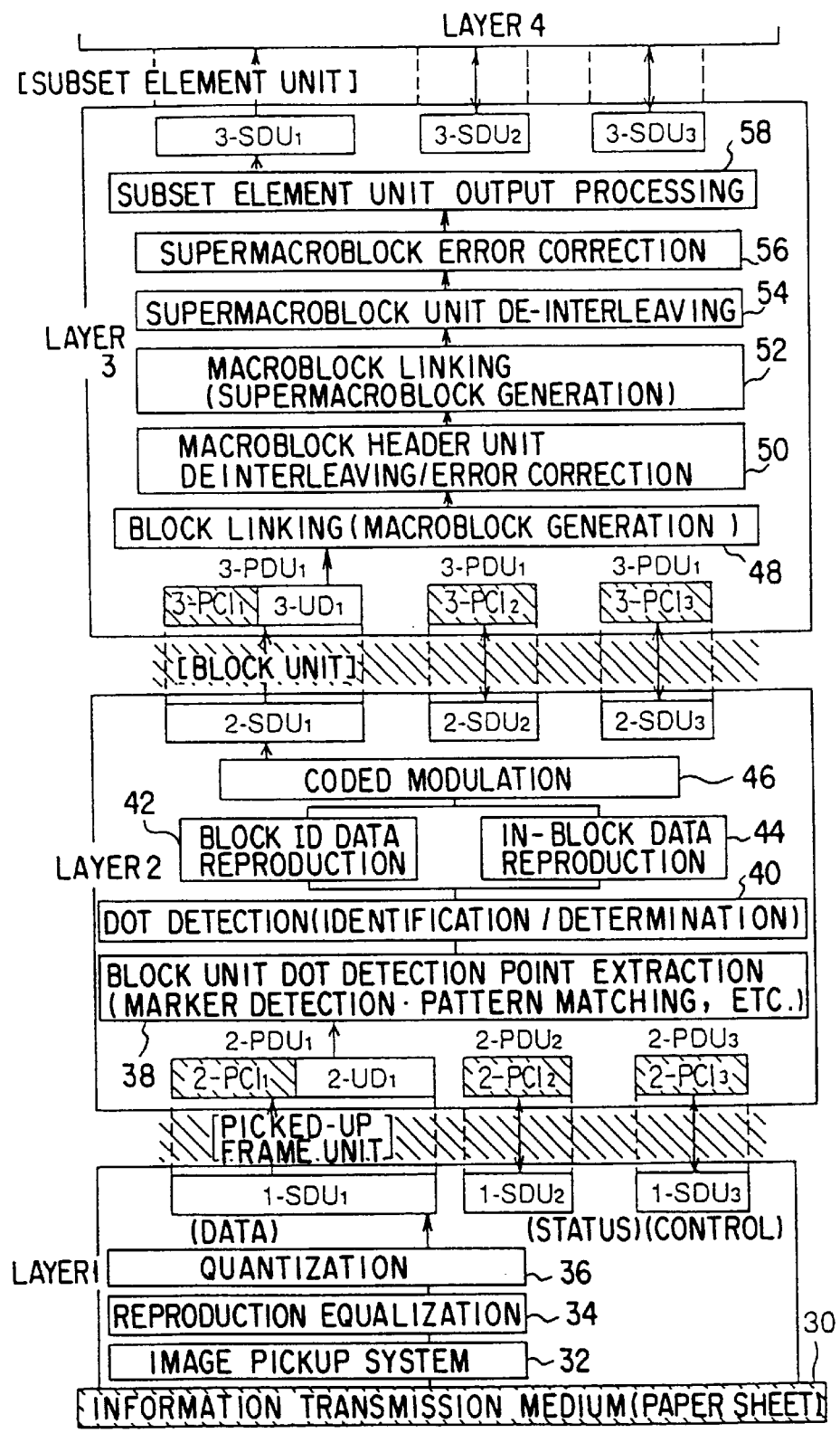
FIG. 3A is a view showing a practical lower layer format in a layered structure on a reproduction side and FIG. 3B is a view showing a practical upper layer format in the layered structure on the reproduction side.
Figure 3B:
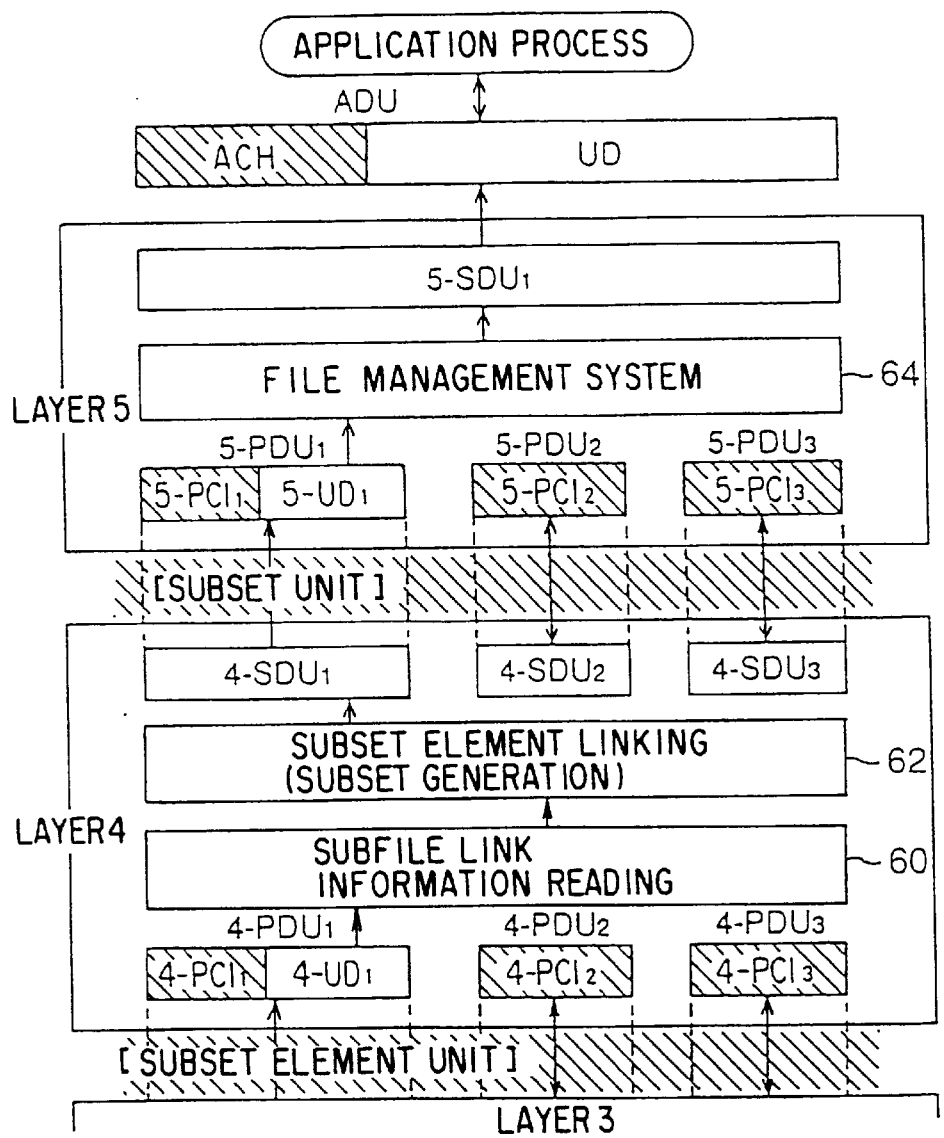

That is, FIGS. 3A and 3B show a multi-layered structure on the reproducing side, that is, a processing at the multiple stages. In those Figures, N-SDU$_n$ shows an Nth layer service data unit, No. n; N-PDU$_n$, an Nth layer protocol data unit, No. n; N-PCI$_n$, an Nth layer protocol control information, No. n (corres. to various processing information of the present invention); N-UD$_n$, an Nth layer user data, No. n; ADU, an application data unit; and ACH, an application control header (n=1 shows data; 2, status information; and 3, control information).

The layer 1 (physical layer) serves a basic function for ensuring positive transmission of quantized data of a dot image. The layer 1 stipulates the electrical/physical conditions and various conditions for quantization, such as the simple transfer regulations, equalization system, quantization system, etc., of the dot pattern. The layer functions required for the layer 1, that is, the services provided are the providing of plural transmission media (kinds of paper), allowance of a multi-dot density, the providing of plural scanner image resolutions, the providing of plural transmission means for video signals, the providing of read start/end functions, and so on, and, if required, can include the multi-gradation display (binary, multi-valued level), the allowance of the multi-dot display (color image pickup, transmission), etc.

Figure 4:
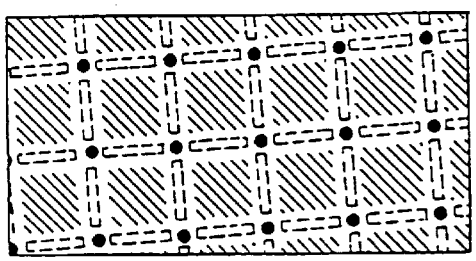
FIG. 4 is a view showing a picked-up dot image.

The layer 1, that is, the physical layer has a function module (image pickup module 32) for optically imaging a dot code pattern recorded on the information recording (transmission) medium 30 such as the paper as shown in FIG. 4 and outputting an image signal and a function module (reproducing equalizing module 34, quantizing module 36) for subjecting an image signal to preprocessing (gain control, equalization processing) and effecting sampling/quantization. It further has a function module for converting a quantized value to digital data and generating image data, a function module for structuring the image data, converting it to a given data format comprising structure information (header, that is, the first processing information) and data (entity of the image data) and outputting it to an adjacent upper layer, that is, the layer 2, a function module for inputting and outputting state information on the processing and control information, etc.

To the upper layer 2 the structuring (image) data of an image frame unit is passed as the service data unit (1-SDU$_1$) from the layer 1.

The layer 2 (block data layer) serves a basic function of positively transmitting the block and in-block bit string. The layer 2 stipulates various conditions for block transmission (namely, a block detection system, channel bit detection system, code modulation/demodulation system, etc.). The in-layer function required for the layer 2, that is, the service provided includes the extraction of blocks and detection of dot sampling points, the providing of a multi-recording system (binary, multi-valued multiplexed system, etc.,), the providing of the multi-block pattern, the providing of the multi-code modulation/demodulation system, the detection of the block relative position, the notice of a block detection error, the overcoming operation of faults, etc. It is to be noted that the providing of the multi-block pattern includes the block size detection function, the mark definition/detection function, the preparation of an order in which various kinds of dots are read out, etc.

The layer 2, that is, the block data layer has a function module for receiving, as a 2-PDU$_1$, structured (image) data (1-SDU$_1$) from the adjacent lower layer, that is, the layer 1, separating, while recognizing, the structuring information (2-PCI$_1$, say, the first processing information) and data entity (2-UD$_1$), and converting the data entity to a form fit for processing, a function module (a block unit dot detection point extraction (marker detection, pattern matching, etc.,) module 38, dot detection (distinguishing/determining) module 40) for processing the data entity converted to the fit form and extracting a plurality of blocks in a given information code unit, and a function module (block ID data reproduction module 42 and in-block data reproduction module 44) for processing the extracted block and for reproducing an information code in a block unit. Here, the block unit information code comprises the structuring information, code modulated information and data entity for linking together a plurality of blocks. The layer 2 has a function module (code demodulation module 46) for reading out the code modulated information from the block unit information and demodulating the data entity in accordance with the code modulated information, a function module for outputting the structured information (block header, that is, the second processing information) of the demodulated blocked information code and data entity (user data), as a 2-SDU$_1$, to the adjacent upper layer, that is, the layer 3, a function module for inputting and outputting state information and control information relating to the processing.

That is, the layer 2 detects the block unit dot detection point, that is, the marker, from the image data for each block data in a first given unit, detects the data dot in block unit in accordance with the detected marker and returns the data in the bit string. This processing has been explained in more detail in PCT/JP93/01377 (WO 94/08314) above. Regarding the data in block unit, a header, that is, block ID data is first reproduced and then the in-block data is reproduced as the user data and, being code demodulated, is passed as block data unit data to the upper layer, that is, the layer 3.

The layer 3 (the data link layer) serves a basic function of ensuring the generation of a given data mass (subset element (fourth given unit)) with a given error quality insured and the positive transmission. The layer 3 stipulates the condition for linking the block data (first given unit), various conditions (that is, the interleaving system/structure) for generating a macroblock (third given unit)/a super macroblock (second given unit), a (super) macroblock header and user data error control (that is, an ECC system/structure), etc. The in-layer function required for the layer 3, that is, the service provided includes the providing of a block address read/write abnormality recovery function, the confirmation (checking of a read effective block) of a desired block read-out state, the setting of the block array structure, the generation of an intermediate data mass, the multiple providing of the interleaving system/scope/structure, multiple providing of the ECC system/scope/structure, etc.

The layer 3, that is, the data link layer has a function module (block link (macroblock generation) module 48) for receiving, as a 3-$PDU_1$, a blocked information code (2-$SDU_1$) from the adjacent lower layer, that is, the layer 2, reading out, while recognizing, structured information (3-$PCI_1$, that is, the second processing information) from this, linking together a plurality of block unit data (3-$UD_1$) in accordance with the structured information and generating a macroblock or a supermacroblock. That is, the layer 3 receives a bit data string in a block unit from the layer 2, separates, while recognizing, a block header as a 3-$PCI_1$ (second processing information) corresponding to a predetermined bit from a head of the respective block and subsequent user data as a 3-$UD_1$, links together the blocks in accordance with the information written in the block header and generates a macroblock. The macroblock thus generated comprises attached information (macroblock header, that is, one of the second processing information) arranged in a distributive way and data entity (user data).

Further, the layer 3 includes a function module (macroblock header unit deinterleaving/error correction module 50) for reading interleaving information from the macroblock header, deinterleaving the user data of the macroblock in accordance therewith, reading error correction information from the macroblock header and subjecting the deinterleaved user data to error correction accordingly, a function module (macroblock link (supermacroblock generation) module 52) for reading structured information for generating (structuring) a supermacroblock from the macroblock header, linking together a plurality of macroblocks in accordance therewith and generating (structuring) a supermacroblock, a function module (a supermacroblock unit deinterleaving module 54) for reading out interleaving information from the macroblock header and deinterleaving the user data of the supermacroblock in accordance therewith, a function module (supermacroblock unit error correction module 56) for reading out error correction information from the macroblock header and subjecting the deinterleaved user data to error correction in accordance therewith, a function module (a subset element unit outputting processing module 58) for reading out structured specification information from the macroblock header to the subset element, that is, a subset element header and separating the subset element from the user data of the error-corrected supermacroblock in accordance therewith, a function module for delivering the separated subset element unit, as a 3-$SDU_1$, to an adjacent upper layer, that is, the layer 4, and a function module for receiving/supplying state information and control information relating to the processing.

That is, the layer 3 performs a multi-stage function for first linking together blocks to generate a macroblock and for linking together such macroblocks to provide a super-macroblock. It reads out the subset-structured specification (third processing information) in the macroblock header after the error correction processing has been ended and delivers the super-macroblock in a form conceptionally divided into the subset elements, that is, passes the data as a 3-$SDU_1$, to the upper layer in subset element units.

The layer 4 (presentation layer) serves the basic function of ensuring the generation of the subsets. The layer 4 defines various functions of generating the subset through the linking of the subset elements. The in-layer function required for the layer 4, that is, the providing service, includes the selective taking of the subset elements necessary for a target file, the generation of the subset and its conditional determination, fit data conversion to a DOS, etc. Here, the subset means recognizable information unit data, that is, the above-mentioned macroblock and supermacroblock contain multimedia information such as sound and picture. In other words, the subset is so-called a data mass recognizable as one information unit, such as the sound if such is only sound information and the picture if such is only picture information.

The layer 4, that is, the presentation layer includes a function module (subfile link information read-out module 60) for receiving, as a 4-$PDU_1$, subset element unit data (3-$SDU_1$) from the adjacent lower layer, that is, the layer 3 and reading structured information (4-$PCI_1$, that is, fourth processing information) out of it and a function module (subset element linking (subset generation) module 62) for linking a data entity (4-$UD_1$) in a subset element unit in accordance with the read-out structured information and generating (structuring) the subset. Here, the data of the subset element unit comprises the structured information (subset element header) for generating (constituting) the subset through the linking of the subset element and the data entity.

Further, the layer 4 includes a function module for reading attached information necessary for an existing or a new interface to the adjacent upper layer out of the generated subset and taking an interface matching, a function module for delivering partial or whole attached information of the subset and data entity as a 4-$SDU_1$ to the adjacent upper layer, that is, the layer 5, and a function module for receiving and supplying the state information and control information relating to the processing.

The layer 5 (application layer) serves a basic function for positively ensuring better operation of the file management. The layer 5 stipulates various conditions (that is, file generation conditions, etc.) for file management. The in-layer function required in the layer 5, that is, the providing service, provides the read/write processing of the application request's file or the subset.

The layer 5, that is, the application layer includes a function module (file management system module 64) for receiving, as a 5-$PDU_1$, data (4-$SDU_1$) of the subset from the adjacent lower layer, that is, the layer 4, reading out the file management information from the subset's attached information (5-$PCI_1$, that is, the fifth processing information) or the data entity (5-$UD_1$), performing a file management in accordance with the file management information, generating a file through the linking of the subset unit or subset and reading it as a file unit, a function module for delivering, as a 5-$SDU_1$ to the application process, the data unit of the subset unit or file unit generated based on the file management, and a function module for receiving and supplying the state information, control information relating to the processing.

The application process serves a basic function for realizing the application utilizing the MMP system. The application process includes the shuffling system/structure of source sample data, scrambling system/structure for encryption, data compressing system/structure, data structure of sound.text.image data, etc. That is, the function required for the application process, that is, the providing service, can includes the providing of the shuffling system of the source sampling data, providing of the scrambling system, etc., and, as required, the providing of data compressing system-compression/expanding operation in plural number, confirmation of a kind of information, selection of the data structure, etc.

One embodiment of the present invention will be explained below with reference to the drawings. The present invention relates to the detail of the layer 1 (physical layer) and layer 2 (block data layer) for realizing a layered structure as set out in the international application PCT/JP95/01050.

FIG. 5 is a view for showing the structure of the layer 1. A controller 66 controls the whole of the layer 1. A light source 68 has its light emission timing, etc., controlled by the controller 66 and is adapted to illuminate a dot code pattern recorded on an information recording (transmission) medium 30 such as paper. Further, an image pickup element 70 corresponds to the above-mentioned image pickup module and is adapted to have its pickup timing, etc., by the controller 66. It optically picks up the dot code pattern to generate an image signal.

The image signal generated from the image pickup element 70 is subjected to preprocessing (gain control, equalization processing, etc.) by an analog processing section 72 corresponding to the reproduction equalization module 34 and then to sampling/quantization processing by an A/D converter 74 corresponding to the quantization module 36 so that it enters a digital processing section 76. And the image data, being subjected to two-dimensional filter processing, etc., by the digital processing section 76, is given a header, that is, a header generated by a header generation section 78, at a header recording section 80 to enable it to be written as a first layer service data unit No. 1 (1-SDU$_1$) into a first memory 82.

Further, with consideration paid to a shading correction, etc., a feedback system is provided which enables the data to be fed from the digital processing section 76 past a D/A converter 84, that is, as an analog signal, back to the analog processing section 72.

To the controller 66 are connected input switches, such as a scanning start switch 86 for instructing the start of scanning of the dot code pattern, an SCF read-out switch 88 for instructing the read-out of a later-described system control file (SCF), and a parameter setting switch 90 for setting the parameters. Further, various input members also are connected there when the need arises. A parameter memory 92 relating to the layer 1 is connected to the controller 66.

Between the controller 66 and the layer 2 a state signal is passed as a first layer service data unit No. 2 (1-SDU$_2$). Here, the state signal means, for example, an error indicating signal, a signal indicating that the data is stored in the memory 82. The generation of the error may be detected by an error generation detection section 66A in the controller 66 or detected by the corresponding circuit configuration section. In the analog processing section 72, for example, a circuit can be provided for detecting such a case as when only a dark portion is input as a video signal. In this case, the detection signal is output to the controller 66 to allow it to be reflected to 1-SDU$_2$.

Further between the controller 66 and layer 2 a parameter setting signal is passed as a first layer service data unit No. 3 (1-SDU$_3$). Here, the parameter setting signal means a signal which, if the dot code pattern for instance is color multiplex recorded, is set to the layer 1 parameter memory 92 on a form to input a red image from the upper layer. In accordance with such a parameter setting signal a controller 66 enables the red to be selected for the light source 68, only the red information to be picked up at the image pickup element 70, a red information-containing head to be generated at the head generation section 78 and the header to be added by the header recording section 80 and written in the first memory 82.

Then the first layer service data unit No. 1 (1-SDU$_1$) will be explained below.

FIG. 6 shows its one practical form where a set standard identification code is first described. The set standard identification code 94 is a code representing parameters, such as the dot size and block size. The set standard identification code 94 allows these parameters to be cited from a given memory with reference thereto, that is, the parameters necessary to the processing of decoding the contents of the data of the dot code performed at the upper layer. In the case where the set standard identification code 94 is, for example, [00], a given parameter is set at the layer 1, a parameter necessary for the layer 2 is set at the layer 2, a parameter necessary for the layer 3 is set at the layer 3, a parameter necessary for the layer 4 is set at the layer 4 and a parameter necessary for the layer 5 is set at the layer 5 and, in this way, all the same code [00] is transferred, such as the layer 1, layer 2, . . . , layer 5 but the respective parameters thus entered differ in the respective layers.

The set standard identification code 94 is set by reading out a system control file (SCF) 96 recorded, as shown in FIG. 7, on an information recording (transmission) medium 30, such as paper, with the dot code 10 recorded.

The SCF 96 is recorded with a pattern of dots in the same way as the dot code 10 as shown in FIG. 8A. The form may be a block configuration as shown in FIG. 1B or a simple dot array. In this connection it is to be noted that the SCF 96 is recorded with dots of given size even in a printing system of low resolution or, in an opposite way, of high resolution. That is, it is preferable to form it as a code with which any MMP reproduction apparatus can be read thereon. It may be possible to prepare a plurality of kinds of SCFs 96 of file size and stipulate the range of the MMP reproduction apparatus readable therewith.

With the SCF readout switch 88 operated, the corresponding operation signal is input to the controller 66 and to the layer 1 parameter memory 92 and a predetermined SCF readout parameter is input to the controller 66 from the parameter memory 92. The controller 66 controls each part in accordance with the input parameter and read-out image data is output, as a 1-SDU$_1$, to the upper layer and a state signal showing that the SCF is reading out is also output, as the 1-SDU$_1$, to the upper layer. In the upper layer, the contents of the SCF 96 is decoded, the parameter setting signal is input as the 1-SDU$_3$ from the upper layer, it is stored in the layer 1 parameter memory 92 and, upon the reading of an actual dot code 10 corresponding to the operation of the scanning start switch 86, a more fit set standard identification code 94 is generated as a portion of the header by the header generation section 78 in accordance with the contents in the parameter memory 92.

Further, instead of being configured with the dots, the SCF 96 may be described with characters, such as "how much size one dot of the dot code 10 is" and "what number is allocated under the set standard", as shown in FIG. 8B. In this case, the operator, seeing the SCF 96, performs a corresponding key-in operation externally on the input means.

Or the set standard identification code 94 can be set by the parameter setting switch 90. That is, through the manual setting of the digital data, such as [00] or [11], by a DIP switch, etc., those parameters such as the dot size may be freely and immediately reflected to the set standard identification code 94.

Then a UD1 format type 98 is described in the 1-SDU$_1$ and the UD1 format type 98 represents the items of the parameters on the image data stipulated with a later-described frame horizontal pixel number 100 to the frame number 114. That is, by describing the UD1 format type 98 it is possible to omit all the contents of these parameters. For example, when this UD1 format type 98 is set to [00], the contents of these parameters may not be stipulated, while, on the other hand, with an [FF] set thereto, a mode is such that parameters can be freely set by the user to allow the parameter to be entered for each item. That is, the UD1 format type 98 has parameter representation function and a function of defining the item of the parameters and switching it to "setting" to which the item can be written.

Here, as parameters a description is made about a frame horizontal pixel number 100, frame vertical pixel number 102, horizontal pixel pitch information 104, vertical pixel pitch information 106, multiplexed information 108, gradation 110, optical magnification 112 and frame number 114. Here, the multiplexed information 108 represents color information of a RGB if such is a color. That is, it is the information of what type a now picked-up image is, such as a red if such is red and a blue if such is blue. Further, the gradation 110 is that represented by the A/D converter 74 and the optical magnification 112 is that of a lens of an optical system, not shown. The frame number 114 is not required in the case where, if one frame after another is entered, sequential processing is started. In a system like the present embodiment where processing is started after all the image data are input to the first memory 82, the frame number 114 is described on the header for the reason that being do so is more readily recognizable.

After these parameters, the image data, becoming the user data 116, is entered.

Since, out of the above-mentioned parameters, the frame horizontal pixel number 100, frame vertical pixel number 102, horizontal pixel pitch information 104, vertical pixel pitch information 106 and optical magnification 112 are information uniquely determined when the image readout section of the MMP reproduction apparatus is manufactured, these may be stored as a ROM in the header generation section 78 or layer 1 parameter memory 92. Further, the parameters can utilize a normally employed image data format such as a TIFF since the layer 1 is a layer handling the image data.

FIG. 9 shows how to write the header. That is, in the case where, as shown on the top area, the image data is written, as the user data 116, at the first pixel, the second pixel the header 118 is first written ahead the pixel data as shown in the second top area.

Here, as the header 118 it may contain only a set standard identification code 94 as shown below and, subsequently shown, it may contain a set standard identification code 94 and UD1 format type 98. Further, as shown at the bottom area, the set standard identification code 94 is provided, followed by the UD1 format type 98, and, if the mode for setting the above-mentioned parameters relative to the UD1 format type 98 is described, then the header may contain parameters of the frame horizontal pixel number 100 to the frame number 114.

With a type of starting the processing of the upper layer after all the image data of a plurality of frames have been stored in the first memory 82, such header 118 has only to be inserted, as one header, into the data which is input to the first memory 82. Further, with a type for starting the processing each time the image data corresponding to one frame is stored, it will not be necessary to insert the header 118 unless the parameter is changed. However, for the confirmation it is preferable to insert a header for each image data of one frame.

FIG. 10 shows a flow chart for explaining the recording processing of the header 118 executed at the header generation section 78 and header recording section 80.

The header generation section 78 first determines whether or not the parameter is confirmed, that is, the parameter for data decoding is entered (step S1). This determination is adapted to avoid consuming any waste time, that is, a time taken for the processing to progress with the parameter not confirmed.

When the parameter is not yet determined, the header generation section 78 delivers error information to the controller 66 (step S2). Upon receipt of the error information the controller 66 allows the generation of the error to be detected at an error generation section 66A and transmits this state, as a state signal of 1-SDU$_2$ to the upper layer. Upon receipt of this state signal the upper layer enables it to be eventually displayed as an error on a monitor and an error sound to be produced, thus informing the generation of the error to the user.

In the case where the parameter is determined, the header generation section 78 sequentially gains access to a format recording section (ROM), not shown, and it reads out a scanner-specific parameter written there, such as the frame horizontal pixel number 100, frame vertical pixel number 102, horizontal pixel pitch information 104, vertical pixel pitch information 106, optical magnification 112, etc., and delivers it to the header recording section 80 (step S3). It generates the parameter, such as the multiplexed information 108 and gradation 110, in accordance with the color and multiplexed information stored in the layer 1 parameter memory 92 through the controller 66 it is set from the upper layer, and is delivered to the header recording section 80 (step S4). The header recording section 80 once writes the parameter, at this stage, in the first memory 82 (step S5).

Thereafter, the header generation section 78 determines whether or not the frame number is finally required (step S6) and, if not, the header recording processing is finished. If required, the frame number is incremented to produce the parameter of the frame number 114 and delivers it to the header recording section 80 (step S7). The header recording section 80 writes the frame number 114 into the first memory 82 (step S8), thus ending the header recording processing.

That is, if, as shown in the timing chart in FIG. 11, the header is recorded first at the step S5, shifting is made to the recording of the frame image and finally the frame number is determined as being required, then the frame number is calculated and written into the first memory 82 at step S8.

An explanation will be given about the layer 2.

The layer 2 receives a first layer service data unit No. 1 (1-SDU$_1$) as a second layer protocol data unit No. 1 (2-PDU$_1$) from the layer 1. Further, it receives a state signal "1-SDU$_2$" as a 2-PCI$_2$ and a parameter setting signal "1-SDU$_3$" as 2-PCI$_3$ while, on the other hand, it delivers a 2-PCI$_2$ as the 1-SDU$_2$ and the 2-PCI$_3$ as the 1-SDU$_3$ to the layer 1.

Here, the state signal shows an error state and scanning state, frame writing state, service data unit writing state, etc., while, in that opposite direction, the state signal shows the read-out service data unit writing state, first memory 82 data reading state, etc. Further, the parameter setting signal is of such a type that it reads out the contents of the parameter from the parameter memory 92 in the layer 1 or writes it there.

The layer 2 comprises the first memory 82 shared by the layer 1, controller 120, block detection section 122, block address detection section 124, in-block data detection section 126, parameter memory 128 and second memory 130 shared by the upper layer, that is, the layer 3. Here, the block detection section 122 and block address detection section 124 correspond to the above-mentioned block unit dot detection point extracting module 38 and dot detection module 40 and the in-block data detection section 126 corresponds to the above-mentioned block ID data reproduction module 42, in-block data reproduction mode 44 and coded demodulation module 46.

The above-mentioned 2-$PDU_1$ is stored in the first memory 82, the header 118 as the structured information among them is input as a second layer protocol control information No. 1 (2-$PCI_1$) to the controller 120 and a second layer user data No. 1 (2-$UD_1$) as the data entity is input to the block detection section 122, block address detection section 124 and in-block data detection section 126.

The block detection section 122 includes sections such as a marker detection section, data array direction detection section, marker interpolation circuit, etc., as set out in detail in the international application PCT/JP93/01377 (WO 94/08314). Further, the block address detection section 124 similarly includes sections such as a block address detection, error determination, accurate center detection section, marker/block address interpolation section, etc. The in-block data detection section 126 similarly includes an address control section, interpolation circuit, binary processing section, threshold determination circuit, demodulation section, etc. Regarding these parts any detailed explanation is omitted.

Further, the parameter memory 128 stores the parameters representing the processing methods, parameters necessary for the processing, such as the block sizes, demodulation system and the data.

On the other hand, the controller 120 includes a protocol control information decoding section 120A, parameter setting section 120B, error generation detection section 120C and control section 120D. Here, the protocol control information decoding section 120A is adapted to decode the data of 2-$PCI_1$ and the parameter setting section 120B reads out the parameter from the parameter memory 128 and, based on the information decoded by the protocol information data decoding section 120A, sets the read-out parameter, or the data calculated from the parameter, to the respective block. The error generation detection section 120C is adapted to detect the generation of, for example, a block address error and other errors and the control section 120D is adapted to control the whole of the layer 2.

Further, the controller 120 enables a state signal 2-$SDU_2$ (3-$PCI_2$ seen from the layer 3 side) and a parameter setting signal 2-$SDU_3$ (3-$PCI_3$ seen from the layer 3 side) to be passed between the controller and the upper layer 3. Here, the state signal includes an error state-representing signal detected at the error generation detection section 120C, a scanning state-representing signal received from the layer 1, a writing state signal of whether or not the contents of the service data unit prepared at the layer 2 is written into the second memory 130 and, in the opposite direction, for example, a reading state signal for determining whether or not the contents of the second memory 130 is read at the layer 3. Further, the parameter setting signal is used to set the data from the upper layer to the parameter memory 128 or read the contents of the parameter memory 128 at the upper layer.

The contents of the service data unit will be explained below.

The 1-$SDU_1$ (2-$PDU_1$) written into the first memory 82 comprises, as shown in FIGS. 13A and 13B, a protocol control information as the header 118 and image data 116 as the user data. Therefore, the explanation is omitted.

The 2-$SDU_1$, the output of the layer 2, written in the second memory 130 comprises, as shown in FIG. 14A, 2-$SDU_1$ attached information 132 as the block header and in-block data 134 since the layer 2 performs processing on the block in an image and writes it as a block unit into the second memory 130.

The above-mentioned 2-$SDU_1$ attached information 132 serves as block identification information and includes, as shown in FIG. 14B, a set standard identification code 136, user data format type 138, block address 140 and in-block data number 142.

Here, the set standard identification code 136 is equal to a one copied from the set standard identification code 94 sent from the layer 1. On the other hand, the user data format type 138 is different from the user data format type 98 of the layer 1 and represents how the layer 3 reads the contents of the 3-$PDU_1$ and how the kinds and contents of the 3-$PDU_1$ are arranged. That is, the definition is the same as that of the layer 1 and, for example, in the case of the user data format type 138 being a code [01] the block address 140 and in-block data number 142 are sent as a format added to the user data and in the case of a code [02] the block address 140 and in-block data number 142 are sent as a form with another data attached to the user data and the layer 3 selects and recognizes the kinds, arrays, etc., of the information 3-$PCI_1$.

By the addition of the block address 140 and in-block data number 142 in this way, the layer 3 recognizes that information and, even if the information of a code with a different block data size is transferred from the layer 2, can recognize its difference and perform processing.

FIG. 15 is a view showing 2-$SDU_1$ attached information 132 in the case where the user data format type 138 is the code [02]. In this case, it contains the information representing the processing states at the block detection time, such as the set standard identification code 136, user data format type 138, block address 140 and in-block data number 142 and, in addition, a block address compensating/not compensating 144, error detection marker information 146, correcting marker information 148, demodulation error number 150 and demodulation error position information 152.

Here, the demodulation error number 150 is so provided that, if upon the linking of the blocks at the layer 3 the same blocks in the data are transferred in duplicate numbers, that is, the blocks of the same address are transferred any given times, when the demodulation error number 150 is transferred from the layer 2, comparison is made between the previous time and this time in terms of the demodulation error numbers so as to enable less error block data to be selected for reconstruction, a data error rate to be reduced prior to error correction and an error correction to be made at high speeds.

Further, in the case where, with respect to the data of the same block transferred in duplicate numbers, there is no error this time in comparison with the bit or data of the demodulation error the previous time, the bit or data is changed to that, this time, so that the error rate can be reduced and hence error correction can be made at high speeds. That is, the demodulation error position information 152 is provided by replacing the error place by a new non-error data at the layer 3.

Further, the error detection marker information 146 is so provided that, with respect to the data of the same block transferred in duplicate numbers, comparison is made between the in-block error detection information (number and area) this time and that the previous time and the block data of less error detection marker information is selected for reconstruction so that the error rate can be reduced and error correction be made at high speeds.

Figure 16A:
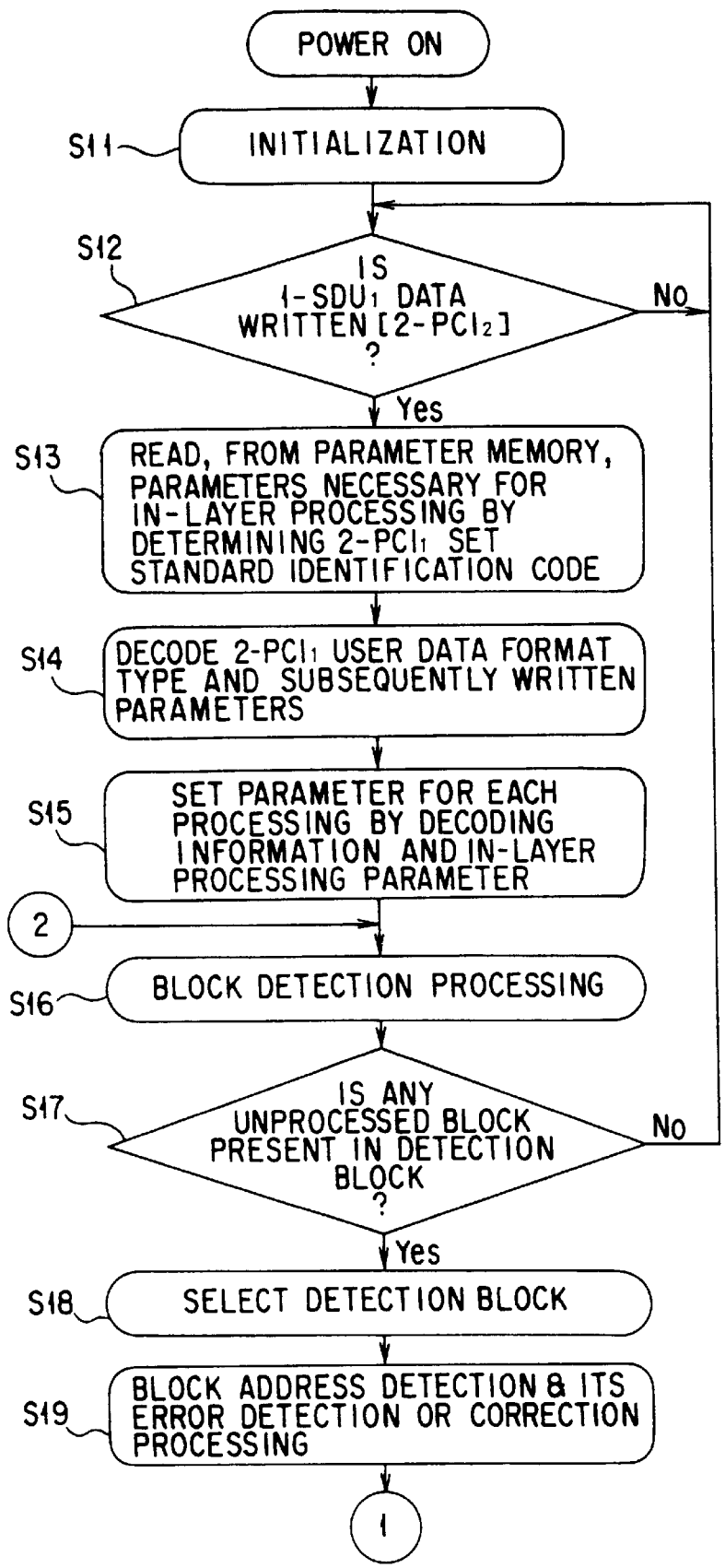
FIGS. 16A and 16B are views showing a flow chart for explaining the operation of a layer 2.
Figure 16B:
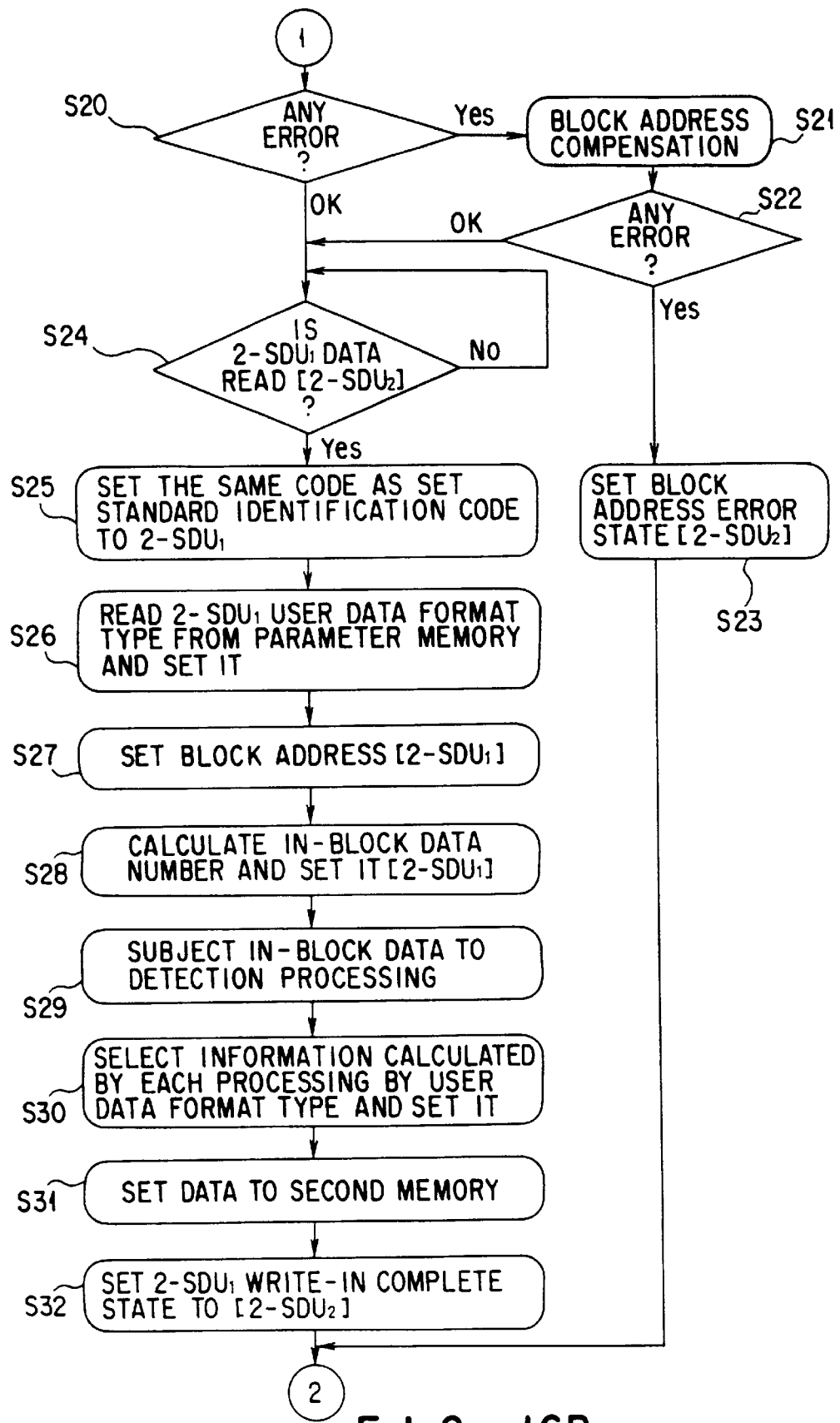

The operation of the layer 2 will be explained below with reference to the flow chart of FIGS. 16A and 16B.

First, the controller 120 (control section 120D) effects initialization (step S11) as a whole and determines, by the readout of the state signal (2-$PCI_2$), whether or not the data of 1-$SDU_1$ is written into the first memory 82 (step S12) and, if there is an unfinished state, such as a "being written" state, waits for the completion of that writing.

With the state, that is, a state that the 1-$SDU_1$ has been written, recognized the set standard identification code 94 of the 2-$PCI_1$ is read out from the first memory 82 by the protocol information decoding section 120A and decoded. In accordance with the result, a parameter necessary for the in-layer processing is read out by the parameter memory 128 (step S13). That is, a parameter unable to be reproduced from the dot code, such as the dot size, block size, a demodulation system and a block address error correction system, is recognized from the set standard identification code 94 and a corresponding parameter is read out of the parameter memory 128.

Then the protocol information decoding section 120A decodes the user data format type 98 and a subsequently written parameter (step S14). That is, through the reading of the information such as the frame horizontal pixel number 100, frame vertical pixel number 102, horizontal pixel pitch information 104, vertical pixel pitch information 106, multiplexing information 108, gradation 110, optical factor 112 and frame number 114, determination is made as to of which type this image is. The setting of the parameter is done (step S15) based on this information and the information read out at step S13.

Then the image data 116 of the 2-$SDU_1$ is input to the block detection section 122 and block detection processing is performed (step S16) through the utilization of a parameter. This allows the block detection to be made in one image. It is determined whether or not there is any unprocessed block of the detected blocks. If not, control is returned back to step S12. That is, if the image is taken from a non-coding portion, no block is detected and control is returned back, thus awaiting the next image.

Further, if any code is determined as being contained in one image, for example, the image contains four untreated blocks, control goes to the next step, thus selecting one of the untreated blocks (step S18). And the detection of the address of the corresponding block and error detection of the address or error correction processing are performed by the block address detection section 124 (step S19).

Here, it is determined, by the error generation detection section 120C, whether or not there is any error (step S20). If there is any error, the block address is compensated for (step S21) and, if there is still an error in this case (step S22), the error state of the block address is set to the 2-$SDU_2$ and, after its transmission to the layer 3 (step S23), control is returned back to step S16, thus allowing the next block to be detected.

In the case where there is no address error at step S20 or an error is determined as having been compensated for at step S22, the 2-$SDU_2$, that is the state signal, is read out and confirmation is made to see whether or not the second memory 130 is empty, that is, whether or not the reading of the data from the second memory 130 has been finished at the layer 3 (step S24), thus waiting for the second memory to become empty.

In the case where the second memory 130 is empty, the set standard identification code 94 of the 2-$PCI_1$ is copied to the 2-$SDU_1$ relative to the layer 3 and set (step S25). Further, the user data format type for transport to the layer 3 is read out of the parameter memory 128 and set to the user data format type 138 of the 2-$SDU_1$ attached information 132 (step S26).

Then the block address detected by the block address detection section 124 is set to the block address 140 of the 2-$SDU_1$ attached information 132 (step S27) and the in-block data number is calculated and set to the in-block data number 142 of the 2-$SDU_1$ attached information 132 (step S28). The calculation of the in-block data number is carried out by the reading-out and application of the block size information stored in the parameter memory 128, that is, the information such as a block of 50 dots in one dimension×50 dots in the other dimension and a marker size of any specific dots.

By the in-block data detection section 126, detection processing is performed on the in-block data containing up to an interpolation and demodulation (step S29) and the information calculated at the respective processing is selected by the user data format type 138 and set (step S30). That is, in the case where it corresponds to, for example, a code [02], the information, such as the block address compensating/not compensating 144, error detection marker information 146, compensating marker information 148, demodulation error number 150 and demodulation error position information 152, is set as shown in FIG. 15.

And the data relative to the layer 3, that is, the in-block data 134 detected by the in-block data detection section 126 is written into the second memory 130 (step S31). After the storage of an "end-of-writing" state in memory has been set to the state signal 2-$SDU_2$, control is returned back to step S16 and, if there is any next block, the same processing is carried out and, if not, a wait is made for the next screen (step S17).

It is needless to say that, although in step S24 the layer 3 has been explained as waiting for the data of the second memory 130 to finish being read out, any such thing has not to be done in the case where the second memory 130 has a great memory capacity. Further, if the data is passed one at a time instead of passing the data for each block, the second memory 130 has not to be provided and, further, instead of the second memory 130 having a memory capacity corresponding to one block, use can be made of, for example, an FIFO memory.

Then, an explanation will be given below about a block link portion in the layer 3 by referring to FIG. 17.

Here, the above-mentioned 2-$SDU_1$ is written into the second memory 130 and it is decoded in a 3-$PCI_1$ protocol control information decoding section 154A in a controller 154. That is, the protocol control information decoding section 154A allows a 2-$SDU_1$ attached information's block detection state information determination section 154A to decode the demodulation error number 150, error position information 152, error detection marker information 146, compensating marker information 148 and block address compensating/not compensating 144 and delivers a result of decoding to the block data selection processing section 156. The block data selection processing section 156 performs such block data selection processing as set out above, that is, the processing on multiply input block data, such as excluding a specific block if it contains more demodulation error, that is, selecting a specific block of less error, to allow associated data to be written in a block data link memory (memory 2') at a memory address corresponding to the block address.

Incidentally, a control section 154B in the controller 154 controls the layer 3 as a whole and a parameter memory 160 stores parameters necessary for each processing.

The arrangement above corresponds to the block link module 48.

FIG. 18 is a flow chart showing those processings performed at the layer 3. That is, first the controller 154 (control section 154B) performs an initialization operation as a whole (step S41) and whether or not the data of the 2-SDU$_1$ is written into the second memory 130 is determined from a readout state signal (3-PCI$_2$) (step S42). And if an unfinished state, such as a "now being written" state, is involved, a wait is made for the writing operation to be finished.

If the 2-SDU$_1$-written state is recognized, the set standard identification code 136 of the 3-PCI$_1$ is first read out and decoded by the protocol information coding section 154A and, in accordance with this result, those parameters necessary for the in-layer processing are read out of the parameter memory 160 (step S43).

The protocol information decoding section 154A decodes the user data format type 138 and subsequently written parameters and the block detection state information determination section 154A, decodes the modulation error number 150 and error position information 152, error detection marker information 146, compensation marker information 148, block address compensating/not compensating 144, etc. (step S44). And the parameter setting is carried out (step S45) based on this information and the information read out at step S43.

Subsequently, the selection of the block data is made by the block data detection processing section 156 on the basis of the above information and the data is written into the block data link memory (memory 2') 158 at a memory address corresponding to the respective block address (step S46). On the data written in the memory 2' other processings, such as the deinterleave and error correction processings, are performed at the layer 3 (step S47) and, thereafter, control is returned back to step S42, waiting for the next data.

Although the present invention has been explained based on the above-mentioned embodiment, the present invention is not restricted to the above-mentioned embodiment and can be variously changed and applied without departing from the spirit and scope of the present invention. Here, the subject of the present invention can be summarized as follows:

(1) An information recording medium is characterized by comprising:

a section recording, as an optically readable code pattern (10), multimedia information containing at least one of audio information, video information and digital code data; and a section recording information (96) representing processing parameters necessary to decode the code pattern.

That is, the information (system control file: SCF) representing processing parameters necessary to decode the code pattern, together with the code pattern, is recorded and the positive decoding of the code pattern can be achieved by setting the parameter in accordance with the SCF.

(2) The information recording medium according to (1) is characterized in that the information representing the processing parameters is recorded as a code pattern of predetermined size.

That is, even if the user does not recognize the format of the code of the SCF, it is possible to set the processing parameters simply by performing the scanning of the SCF code pattern.

(3) The information recording medium according to (1) is characterized in that the information representing the processing parameter is recorded as a character.

That is, the user can recognize the contents of the processing parameters through his or her eyes and, further, the SCF code recognition processing is not required on the reproducing apparatus, thus alleviating the burden of the processing.

(4) An information reproducing apparatus for, out of an information recording medium (30) having a section recording, as an optically readable code pattern (10), multimedia information containing at least one of audio information, video information and digital code data, reading the code pattern and reproducing original multimedia information, is characterized in that the information recording medium records information (96) representing processing parameters necessary to decode the code pattern; and input means (70, 88) is provided for inputting the information representing the processing parameters recorded on the information recording medium.

That is, the information recording medium records, together with the code pattern, the information (system control file: SCF) necessary to decode the code pattern and, by entering the SCF, it is possible to set a parameter in accordance therewith and ensure more positive decoding of the code pattern.

(5) The information reproducing apparatus according to (4) is characterized in that the information representing the processing parameters is recorded as a code pattern of predetermined size; and the inputting means includes reading means (70) for reading out the code pattern and decoding means (120) for decoding the read-out code pattern.

That is, even if the user does not recognize a format of the code of the SCF, it is possible to set the processing parameter simply by scanning the SCF code pattern.

(6) The information reproducing apparatus according to (4) is characterized by further comprising switching means (86, 88) for, upon reading out the code pattern as the information representing the processing parameters, setting the processing parameters of the reading means and decoding means to predetermined parameters and for, upon reading and decoding the code patterns corresponding to the multimedia information, setting the processing parameters of the reading means and decoding means to the decoded parameters.

That is, the SCF and actual code pattern require additional processing parameters and the switching operation is readily performed.

(7) The information reproducing apparatus according to (4) is characterized in that the information representing the processing parameters are recorded as characters; and the inputting means includes switch inputting means (90) for manually inputting the information representing the processing parameters recorded as the characters.

That is, the contents of the processing parameters are recognized by the eye of the user and can be input by the switch. It is not necessary to perform SCF code recognition processing on the information reproducing apparatus, thus alleviating the processing.

(8) The information reproducing apparatus according to (4) is characterized by comprising:

scanning means for scanning the code pattern corresponding to the multimedia information; and means (66A) for delivering an error as an output when the information representing the processing parameters is not input from the inputting means at a time of scanning the code pattern by the scanning means.

That is, the error is not delivered as an output when the processing parameter is not set and, by doing so, the reason that no reproduction is produced even if the code pattern is scanned is evident to the user. Further, this obviates the need to perform any extra subsequent processing on the information reproducing apparatus.

(9) An information reproducing apparatus comprises: first layer processing means for, out of a recording media (30) having a section recording, as an optically readable code (10), multimedia information (30) containing at least one of audio information, video information and digital code data, optically reading the code and for converting the read-out code as an image to code data while outputting the readout-related information (resolution, image pickup range, code data expression format, etc.) in a way to be added as first processing information to the code data; second layer processing means for recognizing (reading out) the first processing information output from the first layer processing means and processing the code data output from the first layer processing means and for generating a block with the code data gathered for each predetermined unit and outputting the block; third layer processing means for extracting, out of the code data of the block, and recognizing second processing information at least necessary to gather blocks output from the second layer processing means and generate a supermacroblock of greater predetermined unit and generating a supermacroblock on the basis of the second processing information, for extracting, from the supermacroblock, and recognizing the third processing information for performing error-handling-related processing and performing, on the basis of the third processing information, supermacroblock error-handling-related processing and for outputting a subset element generated by separating supermacroblocks on the basis of the third processing information; fourth layer processing means for extracting, out of the subset element output from the third layer processing means, fourth processing information at least necessary to generate a subset comprised of a code of a predetermined unit capable of reproducing the multimedia information and for outputting the subset generated based on the fourth processing information; and outputting means for outputting the subset which is output from the fourth layer processing means as reproduced multimedia information, characterized in that the first layer processing means comprises:
image pick-up means (70) for picking up the code;
quantizing means (74) for quantizing a video signal from the image pickup means and for converting the quantized signal to the code data;
header generation means (78, 80) for generating information relating to the image pickup and quantization and adding the information as the first processing information (header) to the code data; and
memory means (82) for storing the code data to which the first processing information is added.

That is, by defining the first layer processing means as set out above, it is possible to stipulate a format for image transmission. Therefore, there is an advantage that, if the image format is stipulated and an image is formed on this format, processing can be made by the subsequent layer processing means (provided the header is required). Further, through the memory means such as a memory it is possible to mark off the processings so that the change in the first layer processing means cannot affect the processing of another layer.

(10) The information reproducing apparatus according to (9) is characterized in that the header generation means includes means for further generating a processing parameter required at the next second layer processing means and for incorporating the processing parameter into the first processing information in a form to be added ahead of the code data.

That is, even if the first layer processing means suffers a variation, the situation can be handled by the second layer processing means by representing the format stored in memory with the header.

(11) The information reproducing apparatus according to (9) characterized in that the header generation means includes means for generating a set standard identification code as reference information of parameters required at other layer processing means and for incorporating the code into the first processing information on a form to be added ahead of the code data.

That is, even if various parameters all are not described, the setting of the parameters is done at each layer simply by referring to the set standard identification code and it is possible to reduce a header data amount.

(12) The information reproducing apparatus according to (9) is characterized in that the header generation means includes means for storing the first processing information in the memory means before a memory operation of the code data and adding the first processing information to the code data.

That is, in the second layer processing means the header can be referred to before the processing of the code data (user data) and, namely, it is possible to set the parameters before the processing and to achieve high speed processing.

(13) The information reproducing apparatus according to (9) is characterized in that the second layer processing means includes decoding means (120A) for decoding the first processing information output from the first layer processing means.

That is, by decoding the first processing information it is possible to handle the first layer processing means (image pickup section) of various arrangements.

(14) The information reproducing apparatus according to (9) is characterized in that the second layer processing means includes: block detection means (122) for detecting, from the code data output from the first layer processing means, a block having the code data gathered in each predetermined unit (for example, 50 dots in one dimension× 50 dots in the other dimension); and block identification information generation means (120) for generating block identification information for identifying the block detected by the block detection means.

That is, by the block identification information it is possible to know the selection of the block data, block number and block-to-block connection method in the next third layer processing means.

(15) The information reproducing apparatus according to (14) is characterized in that the block identification information generation means includes means for generating the block identification information containing an in-block data number.

That is, even if there is any code of various in-block data numbers or any block of a different data number in one code, it is possible to effect reproduction by referring to the in-block data number in the subsequent layer.

(16) The information reproducing apparatus according to (9) is characterized in that the second layer processing means includes: block detection means (122, 124, 126) for detecting, out of the code data output from the first layer processing means, a block gathered in each predetermined unit (for example, 50 dots in one dimension×50 dots in the other dimension); and block detected state information generation means (120) for generating information showing a detected state of the block at the block detection means.

That is, upon the detection of the block the block detected state is generated for each block and, by doing so, it is possible to, by reference to the block detected state, selectively subject a better block to processing and reduce the generation of an error.

(17) The information reproducing apparatus according to (16) is characterized in that the third layer processing means includes means (154A) for decoding the block detected state information.

That is, for the block of a specific block address processed in duplicate numbers the block detected state information is decoded and, by doing so, it is possible to, through the selection of the better block or block data, reduce an error rate. In the case where error correction is done at the subsequent stage, it is possible to increase an error correction rate or to achieve high-speed correction.

(18) The information reproducing apparatus according to (16) is characterized in that the block detection means includes means (126) for demodulating code data, and the block detected state information generation means includes means (120C, 120D) for generating block detected state information containing demodulation error number information.

That is, since demodulation is made by a demodulation means capable of generating the demodulation error number for each block and the demodulation error number is output, it is possible to, in the subsequent layer, selectively subject a block of less demodulation error number to processing and to reduce the generation of an error.

(19) The information reproducing apparatus according to (18) is characterized in that the third layer processing means includes means (154A) for decoding the block detected state information.

That is, for the block of a specific block address processed in duplicate numbers the block detected state information is decoded and, by doing so, it is possible to, through the selection of the block of less demodulation error, reduce the error rate. In the case where the error correction is done at the subsequent stage, it is possible to achieve a high error correction rate or to achieve high-speed correction.

(20) The information reproducing apparatus according to (16) is characterized in that the block detection means includes means (126) for demodulating the code data, and the block detected state information generation means includes means (120C, 120D) for generating block detected state information containing demodulation error position information.

That is, upon demodulation, it is done by the demodulation means capable of generating a demodulation error position for each block and the demodulation error position is output. In the subsequent layer, therefore, it is possible to selectively subject the block data of less demodulation error to processing and to reduce the generation of the error.

(21) The information reproducing apparatus according to (20) is characterized in that the third layer processing means includes means (154) for decoding the block detected state information.

That is, for the block data of a specific block address processed in duplicate numbers, the block detected state information is decoded and, by doing so, it is possible to reduce an error rate through the selection of less demodulation error. In the case where error correction is done at a subsequent stage it is possible to achieve a high error correction rate or to achieve high-speed correction.

(22) The information reproducing apparatus according to (16) is characterized in that the block detection means includes means (122) for detecting a marker (14) provided on the block at a predetermined position, while compensating for not-detected marker, and for detecting a block on the basis of the marker obtained, the block detected-state information generation means includes means (120D) for generating block detected state information containing the compensated marker information (compensation marker number, compensation marker position) 148.

That is, there is sometimes the case where if any compensation marker or many compensation markers are present, the block data position may be in error. By the outputting of the compensation marker information, therefore, it is possible to, in the subsequent layer selectively subject the block of less compensation marker number to processing or to reduce the generation of error.

(23) The information reproducing apparatus according to (22) is characterized in that the third layer processing means includes means (154A) for decoding the block detected state information.

That is, for the block of a specific block address processed in duplicate numbers the block detected state information is decoded and, by doing so, the block of less compensation marker number is selected to reduce an error rate. Further, in the case where error correction is done at the subsequent stage it is possible to achieve a high error correction rate or to achieve high-speed correction.

(24) The information reproducing apparatus according to (16) is characterized in that the block detection means (124) includes block address detection means for detecting a block address representing an address of a block at a predetermined position, block address compensating means (120D) for compensating for a block address regarded as an error by the block address detection means and means (122) for detecting a block on the basis of a block address obtained by the block address detection means and block address compensating means, and the block detected state information generation means includes means (120D) for generating block detected state information (compensated/not compensated) (144) containing the block address compensated for by the block address compensating means.

That is, the probability of the block address being detected as being in error at a time of error correction processing and the compensated block address being in error is higher than that of being not in error at the time of error correction. Further, in the case where the block address is in error, it may be considered as being a burst error caused by dust, defects, etc., and there is a high probability that the block data close to the block address will be in error. By the outputting of the block address compensating information it is possible to, in the subsequent layer, selectively subject a not-compensated block to processing and to reduce the generation of an error.

(25) The information reproducing apparatus according to (24) is characterized in that the third layer processing means includes means (154A) for decoding the block detected state information.

That is, for the block of a specific block address processed in duplicate numbers, the block detected state information is decoded and, by doing so, the not-compensated block is selected to reduce the error rate. In the case where error correction is made at a subsequent stage it is possible to achieve an error correction rate or to achieve high-speed correction.

(26) The information reproducing apparatus according to (16) is characterized in that the block detection means includes means (122) for detecting a marker (14) provided on the block at a predetermined position and for detecting a corresponding block on the basis of the marker obtained, and the block detected state information generation means includes means (120D) for generating block detected state information (132) containing information (146) of a marker erroneously detected by the marker detection means as being present in the block.

That is, in the case where any error detection marker is present in the block, an error is present in the block data. Further, in the case where there are many error detection markers and the size (area) is great, there is a chance of the error rate being high. By the outputting of the in-block error detection marker information it is possible to, in the subsequent layer, selectively subject the block data, that is, the data for which any in-block error detection marker is not detected, or better less detected block data, to processing and to reduce the generation of an error.

(27) The information reproducing apparatus according to (26) is characterized in that the third layer processing means includes means (154A) for decoding the block detected state information.

That is, for the block of a specific block address processed in duplicate numbers, the block detected state information is decoded and the block data, for which no in-block error detection marker is present and which is better detected, is selected to reduce the error rate. In the case where the error correction is made at the subsequent stage it is possible to achieve a high error correction rate or to achieve high-speed correction.

According to the present invention, as set out in more detail, it is possible to provide an information recording medium and information reproducing apparatus which can positively reproduce a code pattern and, even if the code pattern per se is changed in the future, can handle the situations involved.

What is claimed is:

1. An information reproducing apparatus for optically reading a code pattern from an information recording medium and reproducing at least one of audio information, video information and digital code data based on the read code pattern, wherein the code pattern comprises a plurality of blocks each having a data area, a marker serving as a positioning indicator for use in detecting data in the data area, and a block address arranged in a predetermined positional relationship, said information reproducing apparatus comprising:

a reading-out section for optically reading out the code pattern;

a marker detection section for detecting images of the markers out of the code pattern optically read-out by the reading-out section;

a block data select processing section for, when blocks of a same block address are repeatedly read out by the reading-out section, selecting data of any one of the blocks of the same block address; and a memory for receiving the data of the block selected by the block data select processing section and linking the received data to data of a block of another block address, wherein, in comparison with a detection state of the images of the markers detected by the marker detection section, the block data select processing section selects, out of the blocks of the same block address, data of the block which has a less-error-detected marker.

2. The information reproducing apparatus according to claim 1, wherein the less-error-detected marker is defined by at least one of a number, a position and an area of each of the detected markers.

3. An information reproducing apparatus for optically reading a code pattern from an information recording medium and reproducing at least one of audio information, video information and digital code data based on the read code pattern, wherein the code pattern comprises a plurality of blocks each having a data area, a marker and a block address arranged in a predetermined positional relationship, said information reproducing apparatus comprising:

a reading-out section for optically reading out the code pattern;

a marker detection section for detecting the markers out of the code pattern optically read-out by the reading-out section;

a marker compensating section for compensating for undetected markers;

a block data select processing section for, when blocks of a same block address are repeatedly read out by the reading-out section, selecting data of any one of the blocks of the same block address; and a memory for receiving the data of the block selected by the block data select processing section and linking the received data to data of a block of another block address, wherein, in comparison with a compensation state of the undetected markers compensated by the marker compensation section, the block data select processing section selects, out of the blocks of the same block address, data of the block which has a less compensated marker.

4. An information reproducing apparatus for optically reading a code pattern from an information recording medium and reproducing at least one of audio information, video information and digital code data based on the read code pattern, wherein the code pattern comprises a plurality of blocks each having a data area, a marker and a block address arranged in a predetermined positional relationship, said information reproducing apparatus comprising:

a reading-out section for optically reading out the code pattern;

a block address detection section for detecting, out of the code pattern read out by the reading-out section, the addresses of the blocks;

a block data select processing section for, when blocks of a same block address are repeatedly read out by the reading-out section, selecting data of any one of the blocks of the same block address; and a memory for receiving the data of the block selected by the block data select processing section and linking the received data to data of a block of another block address, wherein, in comparison with a detection state of the block addresses detected by the block address detection section, the block data select processing section selects, out of the blocks of the same block address, data of a block which has a better detection state.

5. The information reproducing apparatus according to claim 4, wherein:

the block address detection section includes an error generation detection section for detecting block address detection errors, and a block address compensating section for compensating error-detected block addresses, and the block data select processing section selects, out of the blocks of the same block address, data of a block whose block address has not been compensated.

6. An information reproducing apparatus for optically reading a code pattern from an information recording medium and reproducing at least one of audio information, video information and digital code data based on the read code pattern, wherein the code pattern comprises a plurality of blocks each having a data area, a marker and a block address arranged in a predetermined positional relationship, said information reproducing apparatus comprising:

a reading-out section for optically reading out the code pattern;

an in-block detection section for detecting data in each of the plurality of blocks of the code pattern read by the read-out section;

a block data select processing section for, when blocks of a same block address are repeatedly read out by the reading-out section, selecting data of any one of the blocks of the same block address; and a memory for receiving the data of the block selected by the block data select processing section and linking the received data to data of a block of another block address, wherein the in-block data detection section includes a section for detecting a demodulation error number of data in the blocks, and wherein, in comparison with a detection state of the demodulation error number of the data in the blocks, the block data select processing section selects, out of the blocks of the same block address, data of a block which has a less-de-modulation-error number.

7. An information reproducing apparatus for optically reading a code pattern from an information recording medium and reproducing at least one of audio information, video information and digital code data based on the read code pattern, wherein the code pattern comprises a plurality of blocks each having a data area, a marker and a block address arranged in a predetermined positional relationship, said information reproducing apparatus comprising:

a reading-out section for optically reading out the code pattern;

an in-block detection section for detecting data in each of the plurality of blocks of the code pattern read by the read-out section;

a block data select processing section for, when blocks of a same block address are repeatedly read out by the reading-out section, selecting data of any one of the blocks of the same block address; and a memory for receiving the data of the block selected by the block data select processing section and linking the received data to data of a block of another block address, wherein the in-block data detection section includes a section for detecting a demodulation error position of data in the blocks, and wherein, in comparison with a detection state of the demodulation error position of the data in the blocks, the block data select processing unit selects, out of the blocks of the same block address, data of a block which has no demodulation error.

* * * * *

UNITED STATES PATENT AND TRADEMARK OFFICE
CERTIFICATE OF CORRECTION

PATENT NO. : 6,463,185 B1
DATED : October 8, 2002
INVENTOR(S) : Takeshi Mori

It is certified that error appears in the above-identified patent and that said Letters Patent is hereby corrected as shown below:

<u>Title page</u>,
Item [62], Related U.S. Application Data, after "Jan. 24, 1997", add
-- which is a 371 of PCT/JP95/01467, Jul. 24 1995. --.

Signed and Sealed this

Ninth Day of March, 2004

JON W. DUDAS
*Acting Director of the United States Patent and Trademark Office*